United States Patent
Miyazawa

(10) Patent No.: US 9,456,121 B2
(45) Date of Patent: Sep. 27, 2016

(54) FOCUS ADJUSTING APPARATUS

(71) Applicant: Olympus Corporation, Hachioji-shi, Tokyo (JP)

(72) Inventor: Shingo Miyazawa, Hino (JP)

(73) Assignee: Olympus Corporation, Tokyo (JP)

( * ) Notice: Subject to any disclaimer, the term of this patent is extended or adjusted under 35 U.S.C. 154(b) by 7 days.

(21) Appl. No.: 14/326,254

(22) Filed: Jul. 8, 2014

(65) Prior Publication Data

US 2015/0015728 A1    Jan. 15, 2015

(30) Foreign Application Priority Data

Jul. 9, 2013  (JP) ................................ 2013-143367

(51) Int. Cl.
    *H04N 5/232*    (2006.01)
(52) U.S. Cl.
    CPC ...... *H04N 5/23212* (2013.01); *H04N 5/23296* (2013.01)
(58) Field of Classification Search
    CPC ..................... H04N 5/23212; H04N 5/23296; H04N 5/23251
    See application file for complete search history.

(56) References Cited

U.S. PATENT DOCUMENTS

| | | | | |
|---|---|---|---|---|
| 7,884,877 B2* | 2/2011 | Toguchi | ................. | G02B 7/023 348/345 |
| 2008/0165274 A1* | 7/2008 | Toguchi | ................. | G02B 7/023 348/354 |
| 2009/0244325 A1* | 10/2009 | Honjo | ................... | G02B 7/102 348/231.99 |
| 2010/0231782 A1* | 9/2010 | Okamoto | ........... | H04N 5/23212 348/345 |
| 2013/0155263 A1* | 6/2013 | Kishida | .................. | G03B 13/34 348/208.5 |
| 2013/0308931 A1* | 11/2013 | Ohara | .................... | G02B 7/102 396/81 |
| 2014/0248043 A1* | 9/2014 | Ohara | .................... | G02B 7/102 396/80 |

FOREIGN PATENT DOCUMENTS

JP        2013-011810         1/2013

* cited by examiner

*Primary Examiner* — James Hannett
(74) *Attorney, Agent, or Firm* — John C. Pokotylo; Straub & Pokotylo

(57) ABSTRACT

A focus adjusting process and apparatus are described which can optimize a balance between AF performance and appearance of moving image, regardless of a position or size of an enlarged area to be recorded in a moving image.

14 Claims, 27 Drawing Sheets

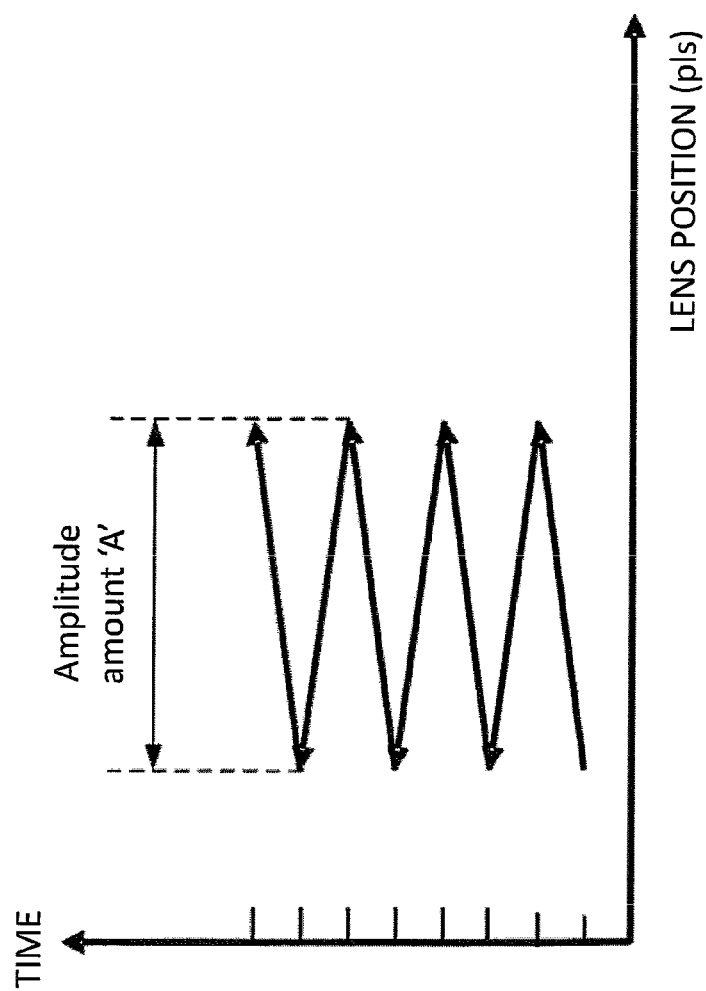

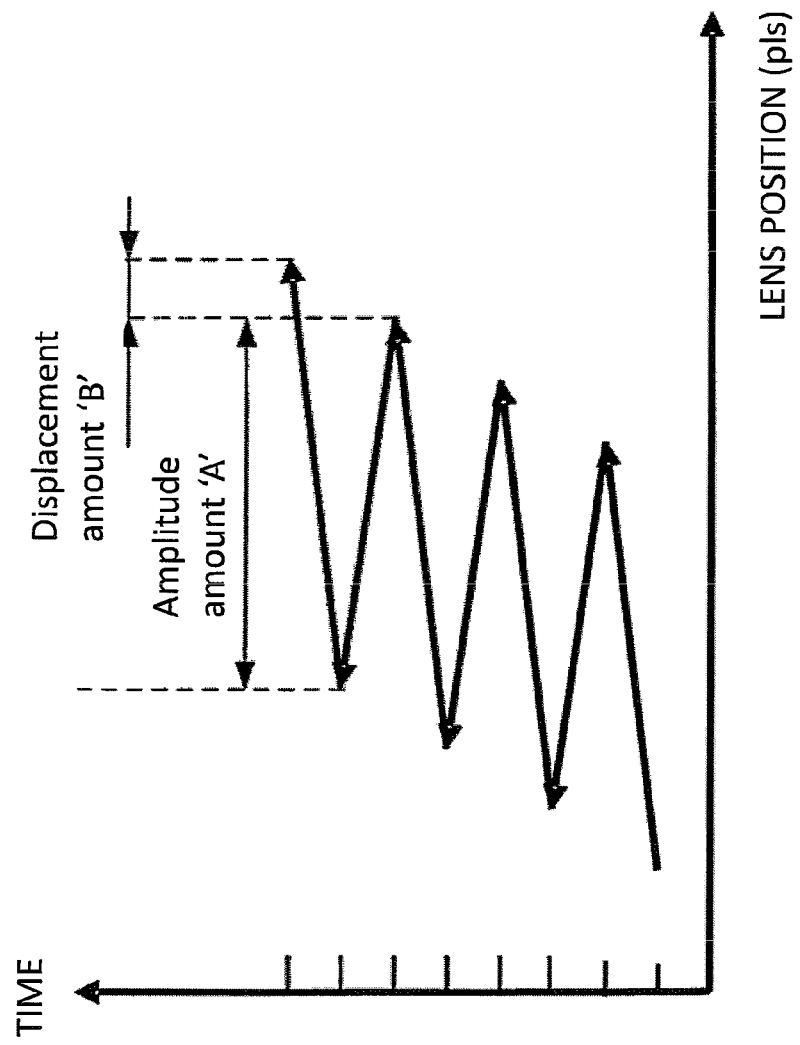

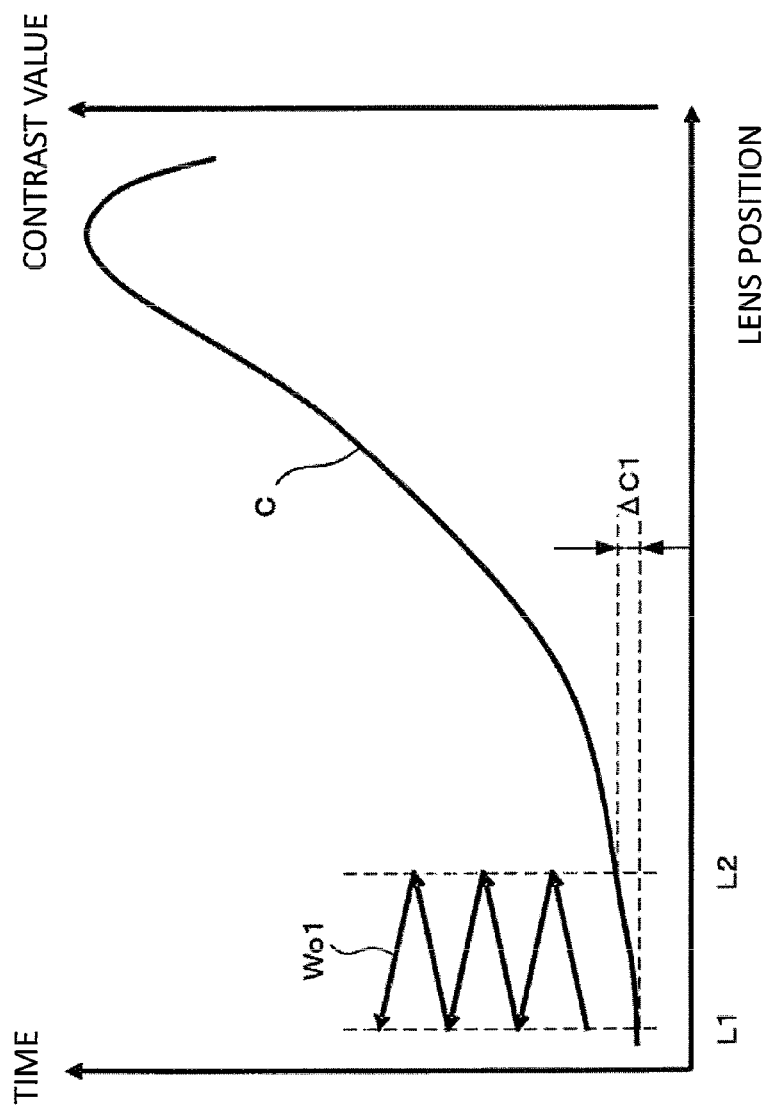

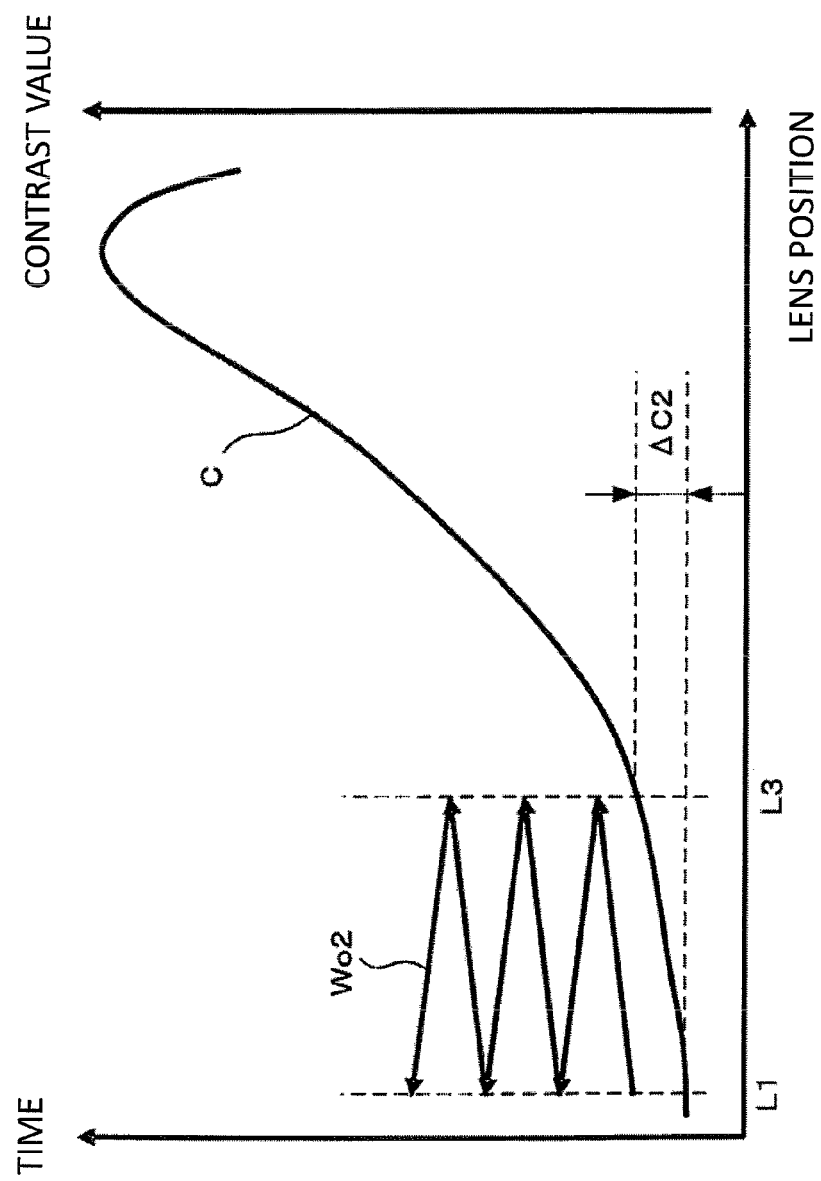

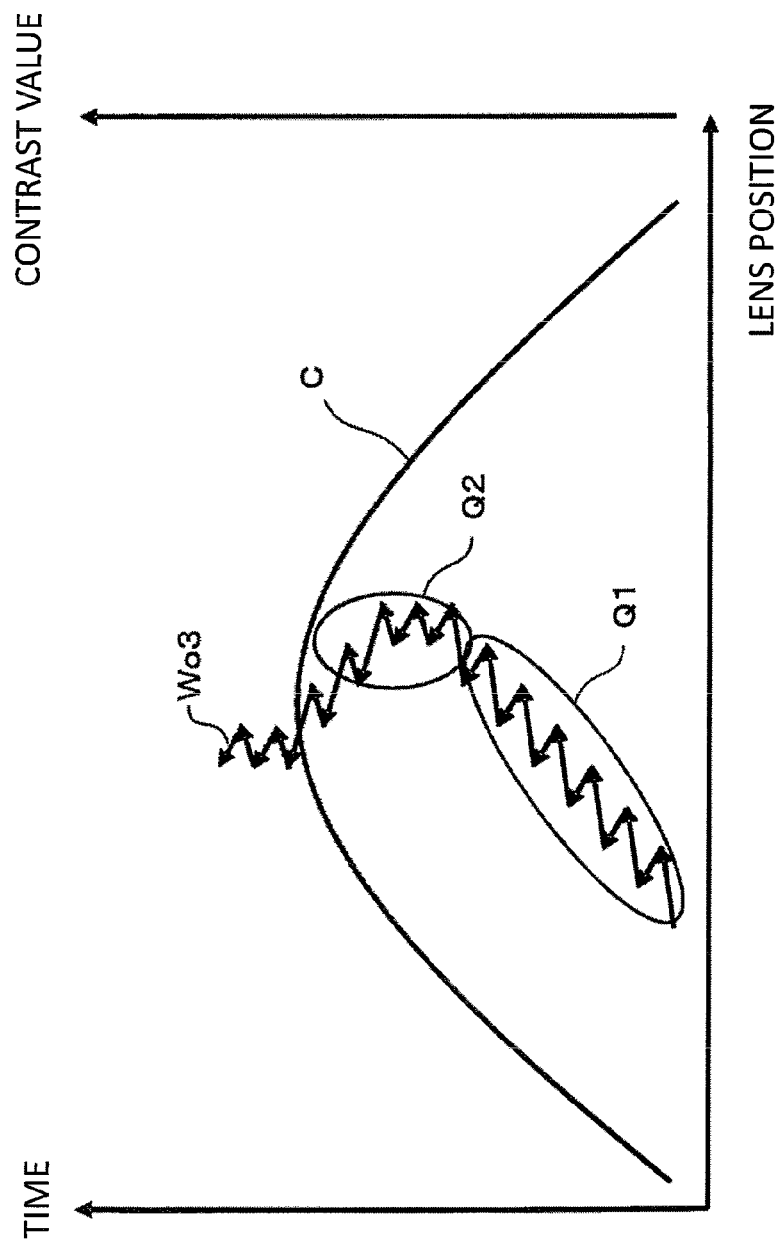

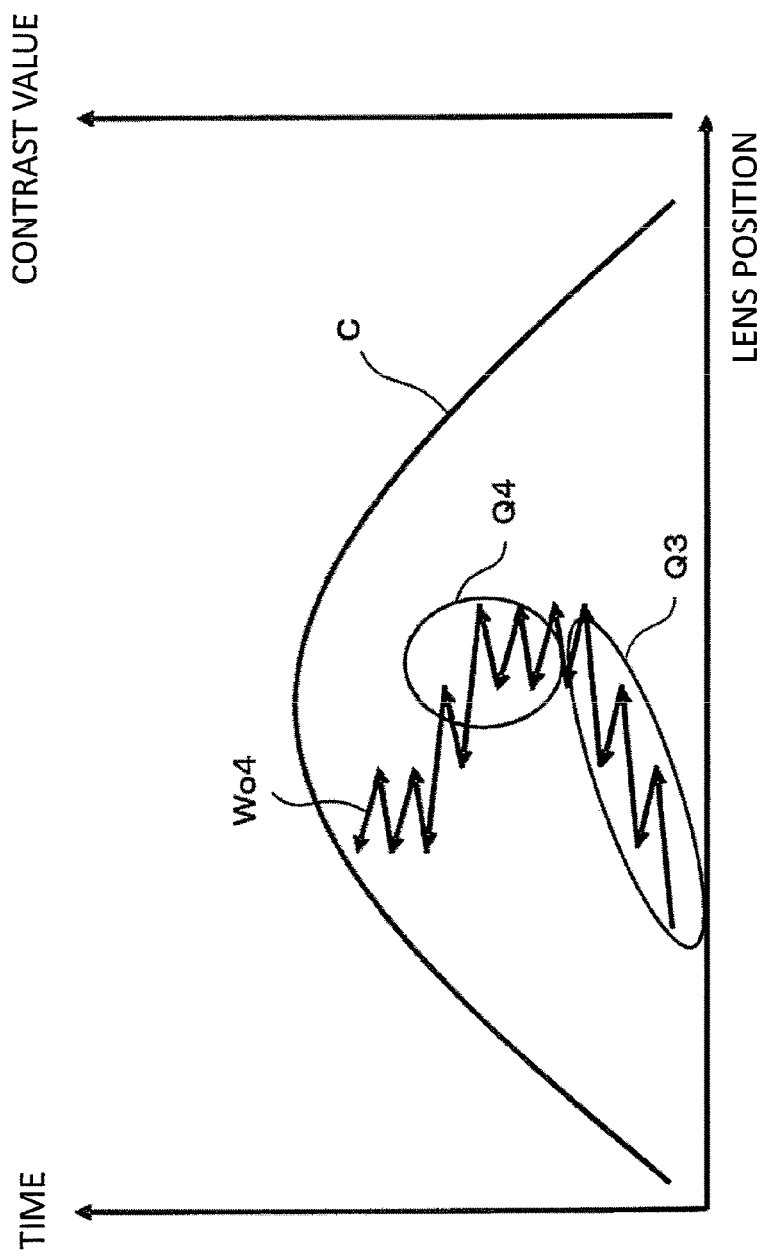

FIG. 10

| Image magnification change | Normal area | Wobbling-restricted area | Wobbling-prohibited area |
|---|---|---|---|
| 0.15% and over | 10% area of capturing center | 50% area of capturing center, except Normal area | Other area |
| 0.10 – 0.15% | 20% area of capturing center | 70% area of capturing center, except Normal area | Other area |
| 0.05 – 0.10% | 40% area of capturing center | 90% area of capturing center, except Normal area | Other area |
| 0.00 – 0.05% | All area | - | - |

FIG. 11A

Reference = 10 pls

| | Same as reference value |
|---|---|
| Normal area | |
| Wobbling-restricted area | 9-1 |
| Wobbling-prohibited area | 0 |

FIG. 12A

Reference = 10 pls

| | |
|---|---|
| Normal area | Same as reference value |
| Wobbling-restricted area | 9-1 |
| Wobbling-prohibited area | 0 |

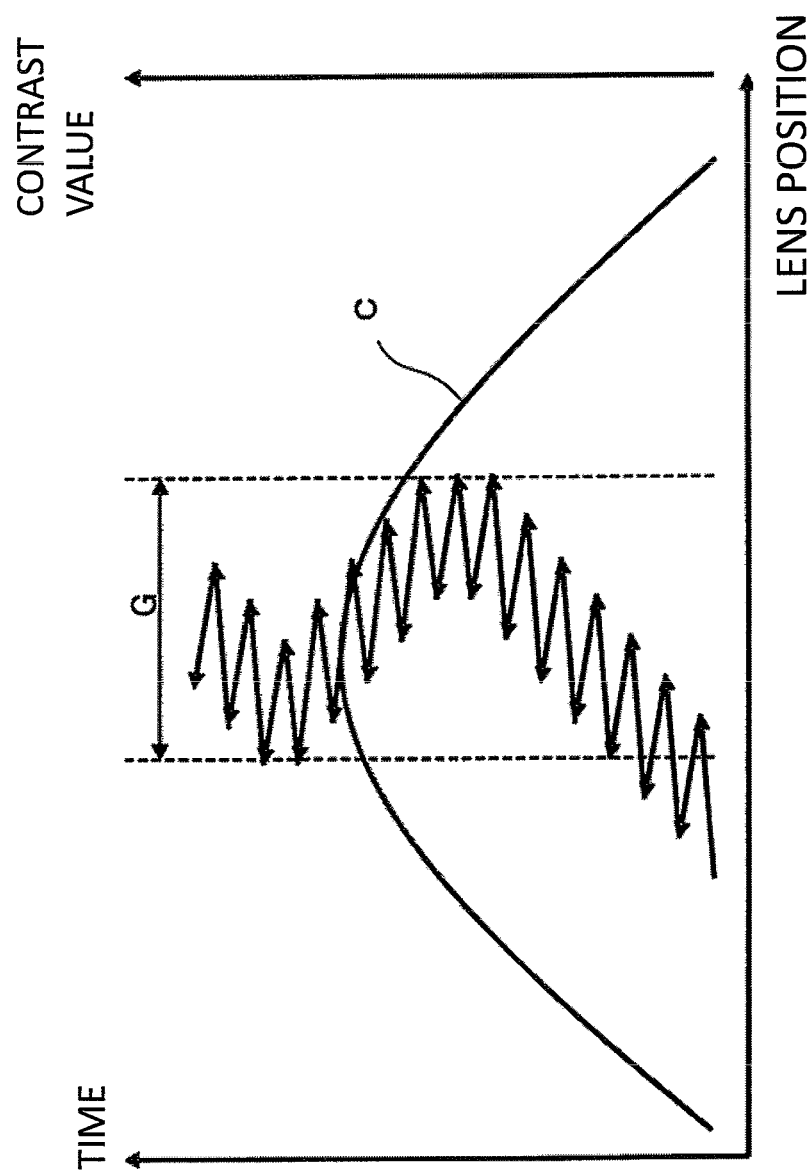

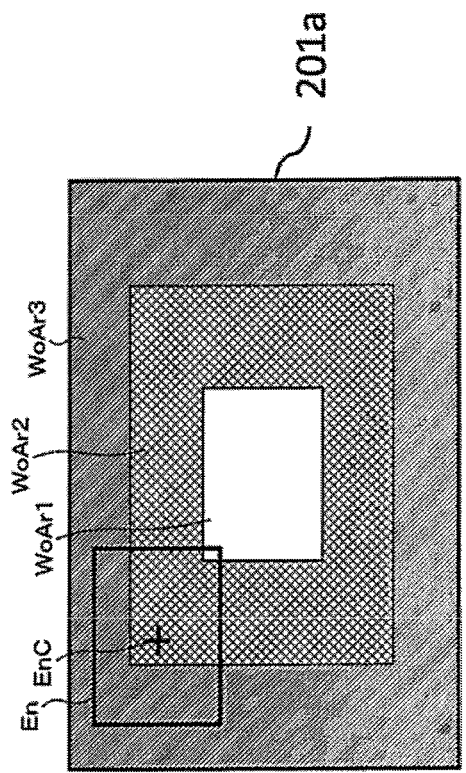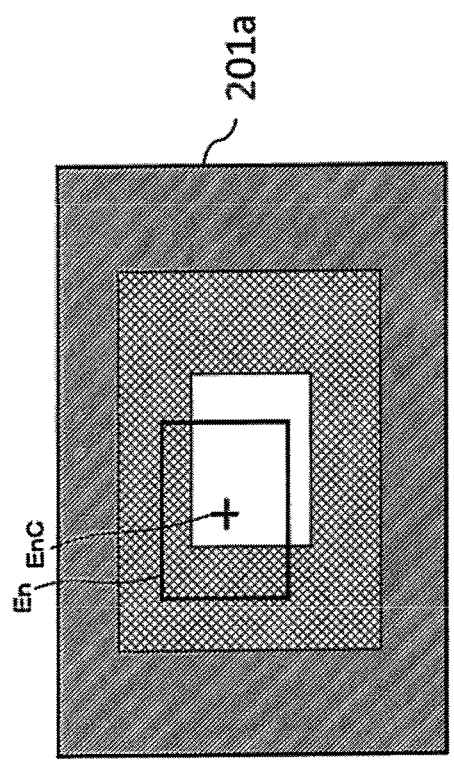
FIG. 14A
FIG. 14B

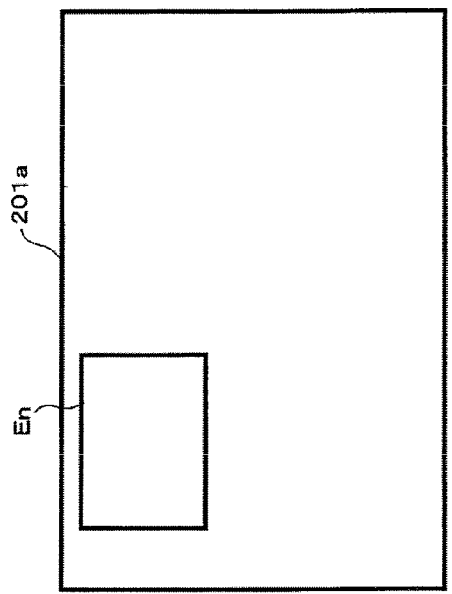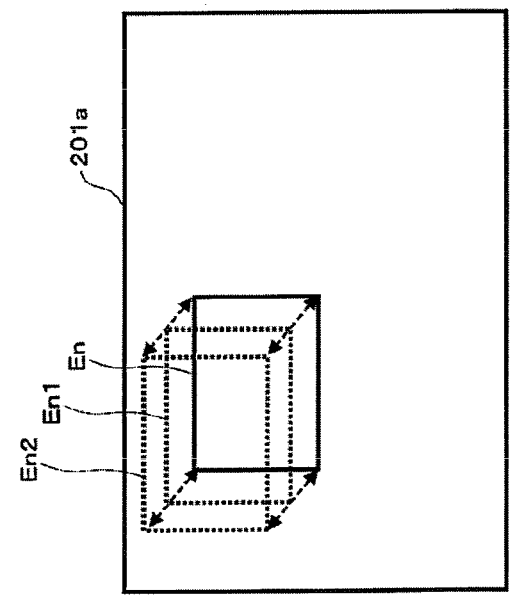
FIG. 15A
FIG. 15B

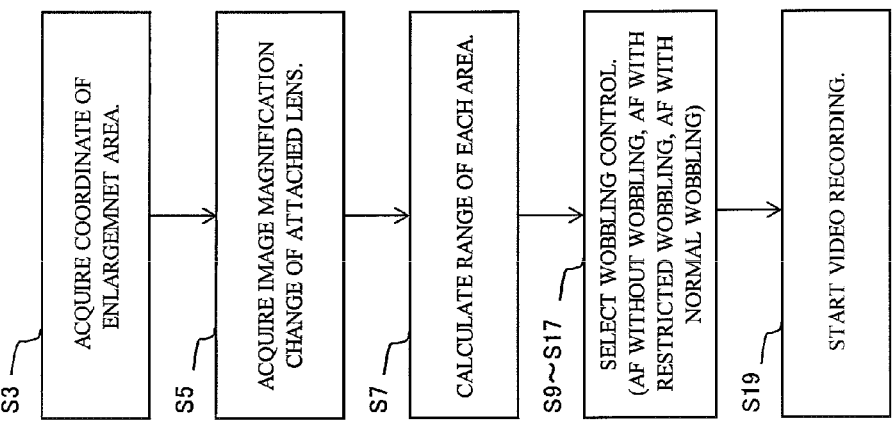

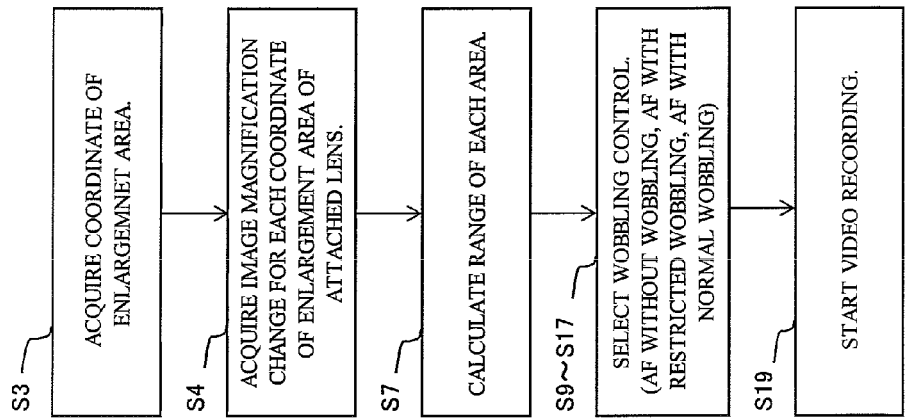

FIG. 16C

| Displacement amount of image | Wobbling control |
|---|---|
| 'A' mm and over | AF without wobbling |
| 'A' mm to 'B' mm | AF with restricted wobbling |
| 'B' mm to 0mm | AF with normal wobbling |

FOCUS ADJUSTING APPARATUS

CROSS-REFERENCE TO RELATED APPLICATION

This application claims the benefit of Japanese Application No. 2013-143367 filed in Japan on Jul. 9, 2013, the contents of which are incorporated herein by this reference.

BACKGROUND OF THE INVENTION

1. Field of the Invention

The present invention relates to a focus adjusting apparatus of an image capturing apparatus which can enlarge, display and record a portion of an object and which can perform focusing of an imaging optical system.

2. Description of the Related Art

Focus adjusting apparatuses which have been widely used convert an optical image into an image signal by an image sensor, generate a contrast signal based on an image signal from a focusing detection range specified within an image capturing range, and perform focusing by moving a focusing lens toward a position that maximizes the contrast signal. In such a contrast-based focus adjusting apparatus, the position of the focusing lens that maximizes the contrast signal (referred to as "the peak position") is detected while the focusing lens is being moved. A technique of performing wobbling drive in order to easily detect a direction in which to move the focusing lens to reach the peak position is disclosed in Japanese Laid-open Patent Publication No. 2013-11810. Image capturing apparatuses which have a function to enlarge a portion of the image capturing range and record a moving image are becoming common.

SUMMARY OF THE INVENTION

The focus adjusting apparatus according to a first example embodiment consistent with the present invention includes (1) an image capturing unit for (i) generating an image signal by forming an optical image by an optical system having a focus lens and capturing the formed optical image on an image sensor and (ii) performing focusing based on a focusing detection signal regarding a focusing detection range specified within an image capturing range, (2) a display unit which displays an enlarged portion of the image capturing range, (3) a storage unit which stores information regarding image magnification change of the optical system due to movement of the focus lens, and (4) a wobbling drive control unit which controls wobbling drive of the focus lens based on (i) information regarding a position of the enlarged portion in the image capturing range displayed by the display unit and (ii) the image magnification change.

The focus adjusting apparatus according to a second example embodiment consistent with the present invention includes (1) an image capturing unit for (i) generating an image signal by forming an optical image by an optical system having a zoom lens and a focus lens and capturing the formed optical image on an image sensor and (ii) performing focusing based on a focusing detection signal regarding a focusing detection range specified within an image capturing range, (2) a display unit which displays an enlarged portion of the image capturing range, (3) a storage unit which stores the information regarding the image magnification change of the optical system due to movement of the focus lens, (4) a zoom position detecting unit which detects a position of the zoom lens in the optical axis direction, and (5) a wobbling drive control unit which controls the wobbling drive of the focus lens in the image capturing unit, based on (i) the information regarding the zoom position, (ii) the position of the enlargement area (to be recorded), and (iii) the image magnification change.

BRIEF DESCRIPTION OF THE DRAWINGS

FIG. 2A is a drawing illustrating an amplitude amount and FIG. 2B is a drawing illustrating a displacement amount, in wobbling control of the camera according to one embodiment of the invention.

FIGS. 3A and 3B are drawings illustrating determination of a focusing position direction of the camera according to one embodiment of the invention.

FIGS. 4A and 4B are drawings illustrating focusing by wobbling drive of the camera according to one embodiment of the invention.

FIG. 10 is an example table illustrating using an image magnification change of the camera to lookup areas of the imaging sensor used to select an AF wobble mode.

FIG. 11A is a table illustrating displacement amounts of the wobbling control in accordance with each of a plurality of areas of the imaging sensor.

FIG. 12A is a table illustrating amplitude amounts of the wobbling control in accordance with each of a plurality of areas of the imaging sensor.

FIGS. 12B and 12C are graphs showing how focusing is performed by restricted-wobbling drive, in the camera according to one embodiment of the invention.

FIGS. 14A and 14B are diagrams illustrating using areas of the imaging sensor of the camera according to one embodiment of the invention to select an AF wobble mode.

FIGS. 15A and 15B are diagrams illustrating the shift of an enlargement area in accordance with wobbling drive in the camera according to one embodiment of the invention.

FIGS. 16A and 16B are flowcharts showing an operation overview, and FIG. 16C is a table for showing selection of wobbling control, in a modified example of the camera according to one embodiment of the invention.

DETAILED DESCRIPTION OF THE PREFERRED EMBODIMENTS

Example embodiments will be described in the following in accordance with the drawings using a camera to which the present invention has been applied. The camera includes an image capturing unit which generates an image signal by forming an optical image by an optical system having a zoom lens and a focus lens capturing the formed image on an image sensor. The camera performs focusing based on a focusing detection signal regarding a focusing detection range set within an image capturing range. Focusing a so-called hill-climbing system in which (1) a contrast value is calculated based on the image signal from the image capturing unit and (2) a focusing position of the focusing lens is set at a position where the contrast value calculated peaks (that is, at a position where the contrast is maximized) while the focus lens is being moved.

Figure 1:
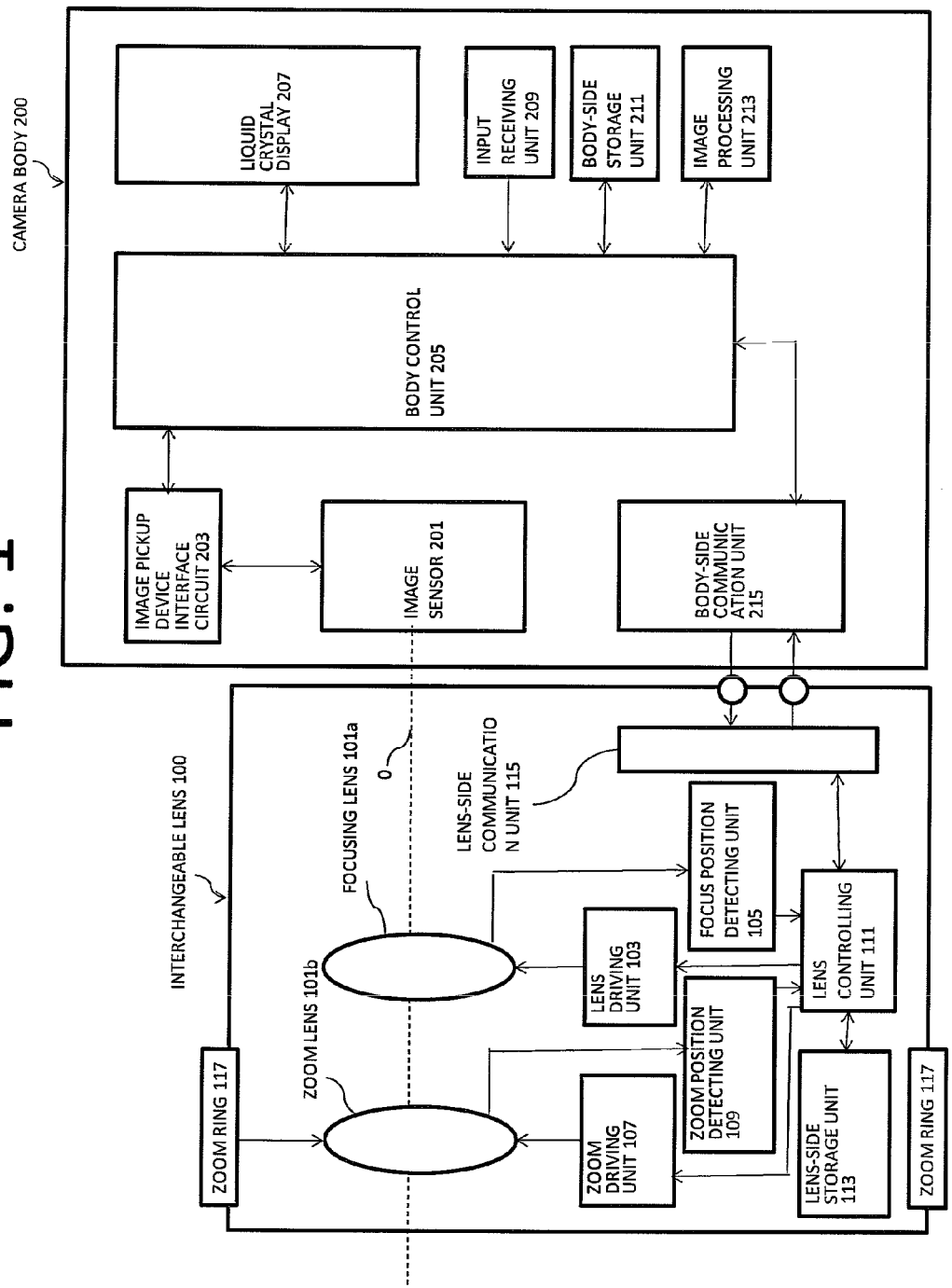
FIG. 1 is a block diagram showing an electrical structure of a camera according to one embodiment of the invention.

FIG. 1 is a block diagram mainly showing an electrical structure of the camera according to an example embodiment consistent with the present invention. The camera includes an interchangeable lens 100 having a focal-length-variable imaging optical system and a camera body 200 on which the interchangeable lens is detachably mounted. In the present example embodiment, the interchangeable lens 100 can be attached to and detached from the camera body 200. However, other example embodiments can be applied to a camera system where an imaging lens is integrally configured with a camera body. In the case of a camera body provided with an integral lens, a lens-side communication unit 115 and a body-side communication unit 215 (both described later) may be omitted. Also a body control unit 205 and a lens controlling unit 111 (both described later) and a body-side storage unit 211 and a lens-side storage unit 113 (described later) may be commonly configured, respectively in such a case.

A focusing lens 101a and a zoom lens 101b included in the imaging optical system are disposed inside the interchangeable lens 100. (These imaging lenses are collectively referenced with element number '101'.) The focusing lens 101a may be configured as a part of the zoom lens 101b. There are no particular limitations regarding the arrangement of the lenses, the number of the lenses, materials of the lenses, and shapes of the focusing lens 101a and the zoom lens 101b. The imaging lens 101 does not need to have a zoom function. In a case in which the imaging lens 101 does not have the zoom function, a zoom driving unit 107, a zoom position detecting unit 109 and a zoom ring 117 (described later) are not necessarily required and may be omitted. The focusing lens 101a can be moved by a lens driving unit 103 in directions defined by an optical axis O. An in-focus position changes by changing a position of the focus lens 101a. The position of the focusing lens 101a is detected by a focus position detecting unit 105, and then output to the lens controlling unit 111.

The zoom lens 101b can be moved by the zoom driving unit 107 in the directions defined by the optical axis O. A focal length of the imaging system changes by changing a position of the zoom lens 101b. The position of the zoom lens 101b is detected by the zoom position detecting unit 109, and then output to the lens controlling unit 111. The zoom ring 117 is rotatably disposed around an outer periphery of a lens barrel of the interchangeable lens 100. A user can manually rotate the zoom ring 117 to change the position of the zoom lens 101b, thereby changing the focal length of the imaging system. The position of the zoom lens 101b may be changed in other ways.

The lens-side storage unit 113 is a non-volatile electrically rewritable memory, such as a flash ROM. The lens-side storage unit 113 stores a control program (executed by the lens controlling unit 111) and various adjustment values (for example, the range of wobbling amplitude amount that users can set, the range of wobbling displacement amount the user can set, etc.) for the interchangeable lens 100. Additionally, the lens-side storage unit 113 stores information regarding image magnification change (described later with reference to FIGS. 6-8) of the imaging optical system due to movement of the focus lens 101a. The information regarding the image magnification change is stored as an image magnification change per lens drive amount of the focusing lens 101a at a zoom position, or in a form of a table or a converting equation which specifies a relationship between the position of an area to be recorded in enlargement in the image capturing range (referred to as an "enlargement area" or an "enlargement portion") and the image magnification change.

The lens-side communication unit 115, which is connected to the body-side communication unit 215 via a communication terminal, communicates with the body control unit 205 and the lens controlling unit 111. The information regarding the image magnification change stored in the lens-side storage unit 113 is sent to the body control unit 205 in the camera body 200 via the lens-side communication unit 115 (and the body-side communication unit 215), and temporarily stored in the body-side storage unit 211.

The lens controlling unit 111 runs a program stored in the lens-side storage unit 113 to control the interchangeable lens 100 in response to control instructions from the body control unit 205 in the camera body 200.

In the camera body 200 to which the interchangeable lens 100 is attached, the image sensor 201, an image sensor interface (hereinafter abbreviated as 'image sensor IF') circuit 203, the body control unit 205, a liquid crystal display 207, a camera operation input receiving units (e.g., one or more switches, dials, etc.) 209, the body-side storage unit 211, an image processing unit 213, and the body communication unit 215, are disposed. The camera body 200 does not necessarily include the liquid crystal display 207, the camera operation switch 209, the body-side storage unit 211, and the image processing unit 213, and another electronic device may be included instead of, or in addition to, such components. When the interchangeable lens 100 is attached to the camera body 200, the body-side communication unit 215 communicates with the lens controlling unit 111 via a communication terminal and the lens-side communication unit 115.

The image sensor 201, which is positioned on the optical axis O of the imaging lens 101 to capture the object image formed by the imaging lens 100, photoelectrically converts the object image and outputs an image signal to the image sensor IF circuit 203. The image sensor IF circuit 203 reads the image signal from the image sensor 201, performs signal processing such as analog-to-digital conversion (ADC), and outputs the image signals to the body control unit 205. The image sensor 201 and the image sensor IF circuit 203 function as an image capturing unit which generates the image signal by capturing the optical image formed by the optical system having a focus lens.

The liquid crystal display 207, which is connected to the body control unit 205, functions as a display unit. The liquid crystal display 207 facilitates live view display based on image data output from the image sensor 201. Additionally, the liquid crystal display 207 facilitates the reproduction and display of image data stored in a recording medium (not shown). Additionally, the liquid crystal display 207 can display various control screens, such as a menu screen for example. Additionally, a portion of the image capturing range of the image sensor 201 is enlarged (the "enlargement portion" or "enlargement area") and displayed on the liquid crystal display 207. The liquid crystal display 207 is not limited to a liquid crystal panel, and other types of display panels, such as an organic light emitting display, can be used instead.

The camera operation input receiving units 209 is an operation member for the user to provide various instructions to the camera. For example, a power switch, a release button, a movie recording button (REC button), an enlargement button, a menu switch, an arrow pad, and an OK button are disposed on the exterior of the camera body 200. An operation state of these camera operation input receiving units is detected, and then output to the body control unit 205.

The body-side storage unit 211, which is connected to the body control unit 205, includes a rewritable non-volatile memory. The body-side storage unit 211 stores control programs executed by the body control unit 205. Additionally, the body-side storage unit 211 temporarily stores the various adjustment values of the interchangeable lens 100 and the information regarding the image magnification change of the imaging optical system due to movement of the focus lens 101a read from the lens-side storage unit 113. The information regarding the image magnification change is temporarily stored in a form of a table or a converting equation which defines a relationship between the position of the enlargement area and the image magnification change.

The image processing unit 213 performs various image processing on the image data output from the image sensor IF circuit 203, such as, for example, an optical black (OB) subtraction process, a white balance (WB) adjustment process, a demosaic process of image data (in a case where an imaging element has a Bayer pattern), a gamma correction process, a color reproduction process, a color matrix computing process, a noise reduction (NR) process, an edge emphasis process, etc. The image processing unit 213 then outputs the image-processed image data to the body control unit 205.

The body control unit 205, which includes a control unit such as a CPU, runs the program stored in the body-side storage unit 211 to control the camera body 200 and communicates with the lens controlling unit 111, via the body-side communication unit 215 and the lens-side communication unit 115, to control the entire camera system.

The body control unit 205, the lens controlling unit 111, and the lens driving unit 103 collectively function, in cooperation with each other, as a wobbling drive control unit. The wobbling drive control unit controls wobbling drive of the focus lens 101a. In the wobbling drive, the wobbling drive control unit performs control based on (i) the information regarding the position of the enlargement area and (ii) the image magnification change (and perhaps a zoom position).

Next, the wobbling drive will be explained. The wobbling drive is a control process to finely adjust focus and determine a focusing position direction by slightly driving the focus lens 101a toward a wide-angle end and a telephoto end alternately (e.g., every time the image data corresponding to one frame is acquired), and gradually displacing an amplitude center (described below with reference to FIGS. 2A and 2B). According to the present example embodiment, there are two parameters used in the wobbling control; that is, an amplitude amount and a displacement amount. As described in more detail below with reference to FIG. 5, in the wobbling control, auto focus (AF) progresses while transiting between different wobble drive states, such as a scan drive state and a stand-by state.

The amplitude amount and the displacement amount as the two parameters in the wobbling control will now be described with reference to FIGS. 2A, 2B, 4A and 4B.

FIG. 2A is a drawing illustrating the amplitude amount, and FIG. 2B is a drawing illustrating the displacement amount. As shown in FIG. 2A, an amplitude amount 'A' is an amount of driving the focusing lens 101a toward the wide-angle end and the telephoto end in the optical direction periodically and alternately. As will be described with reference to FIGS. 3A and 3B, as the amplitude amount 'A' increases, a contrast change amount can be more easily detected. Accordingly, it is easy to determine a direction to move the focusing lens 101a to maximize contrast. and it is easy to recognize a change in the image due to wobbling when the amplitude amount 'A' is large. On the contrary, as the amplitude amount 'A' decreases, it becomes more difficult to recognize the change in the image due to wobbling. Accordingly, the contrast change amount can become more difficult to detect, and direction determination can become more difficult as 'A' decreases.

As shown in FIG. 2B, a displacement amount 'B' is an amount of moving the focusing lens 101a so that the amplitude center gradually drifts toward the wide angle end or telephoto end in order to adjust focusing. As the displacement amount 'B' increases, focusing can be achieved quicker since quick displacement to a position corresponding to a maximum contrast value is possible. Further, a change in the image due to wobbling is more easily recognized. On the contrary, as the displacement amount 'B' decreases, focusing takes longer, and a change of the image due to wobbling is less easily recognized.

FIGS. 3A and 3B show examples for direction determination of scan drive by the wobbling control. The horizontal axis indicates a position of the focusing lens 101a. The first vertical axis (the vertical axis on the left side) indicates time, and the second vertical axis (the vertical axis on the right side) indicates a contrast value. The position of the focusing lens 101a associated with wobbling drive Wo1 (in FIG. 3A) and wobbling drive Wo2 (in FIG. 3B) is indicated by the respective horizontal axes, and levels of a contrast 'C' relative to the lens position are shown using the respective second vertical axes. FIG. 3A shows the wobbling drive when the amplitude amount 'A' is smaller, while FIG. 3B shows the wobbling drive when the amplitude amount 'A' is larger.

In the example shown in FIG. 3A, the wobbling drive Wo1 is performed with respect to the focusing lens 101a between lens positions L1 and L2. In the example shown in FIG. 3A, the amplitude amount 'A' of the wobbling drive Wo1 of one cycle is small and a contrast change amount ΔC1 obtained by this wobbling drive is also small. Accordingly, determining the direction of the scan drive of the focus lens 101a is difficult.

In the example shown in FIG. 3B, the wobbling drive Wo2 is performed with respect to the focusing lens 101a between lens positions L1 and L3 (L3>L2). In the example shown in FIG. 3B, the amplitude amount 'A' of the wobbling drive Wo2 of one cycle is large and a contrast change amount ΔC2 obtained by this wobbling drive is also large. Accordingly, determining the direction of the scan drive of the focusing lens 101a is easier than when the amplitude amount 'A' of the wobbling drive is smaller. As should be appreciated from FIGS. 3A and 3B, generally, as the amplitude amount 'A' of the wobbling drive increases, a difference between obtained contrast increases and determining the direction of the scan drive of the focusing lens 101a becomes easier. As a result of this direction determination, the focusing lens 101a may be largely driven by scan drive, or focusing may be gradually performed by a set wobbling displacement amount 'B'.

FIGS. 4A and 4B shows examples of focusing by wobbling drive, where the horizontal axis indicates a position of the focusing lens 101a, the first vertical axis (the vertical axis on the left side) indicates time, and the second vertical axis (the vertical axis on the right side) indicates a contrast value, as was the case with FIGS. 3A and 3B. The position of the focus lens 101a in association with wobbling drive Wo3 and wobbling drive Wo4 is shown in the respective horizontal axes, and the level of the contrast 'C' relative to the lens position is shown in the respective second vertical axes. FIG. 4A shows the wobbling drive when the displacement amount 'B' is small and FIG. 4B shows the wobbling drive when the displacement amount 'B' is large.

In the examples shown in FIGS. 4A and 4B, the wobbling drive Wo3 or the wobbling drive Wo4 is performed to facilitate contrast-based focusing while the focusing lens 101a moves. Contrast information is acquired while the focusing lens 101a is alternately driven toward the wide-angle end and the telephoto end (e.g., for each frame), and the focusing lens 101a moves toward the peak contrast position based on the contrast information (see areas Q1 and Q3). When it is determined that the focusing lens 101a has passed the peak contrast position (see areas Q2 and Q4), the driving direction of the wobbling drive is reversed (e.g., by changing the direction of the displacement amount) and the focus lens 101a is controlled so as to be stable at the peak position.

According to the present example embodiment, the two parameters regarding the wobbling control, that is, the amplitude amount 'A' and the displacement amount 'B', are changed in accordance with (i) the image magnification change of the lens and (ii) the enlargement position.

Figure 5:
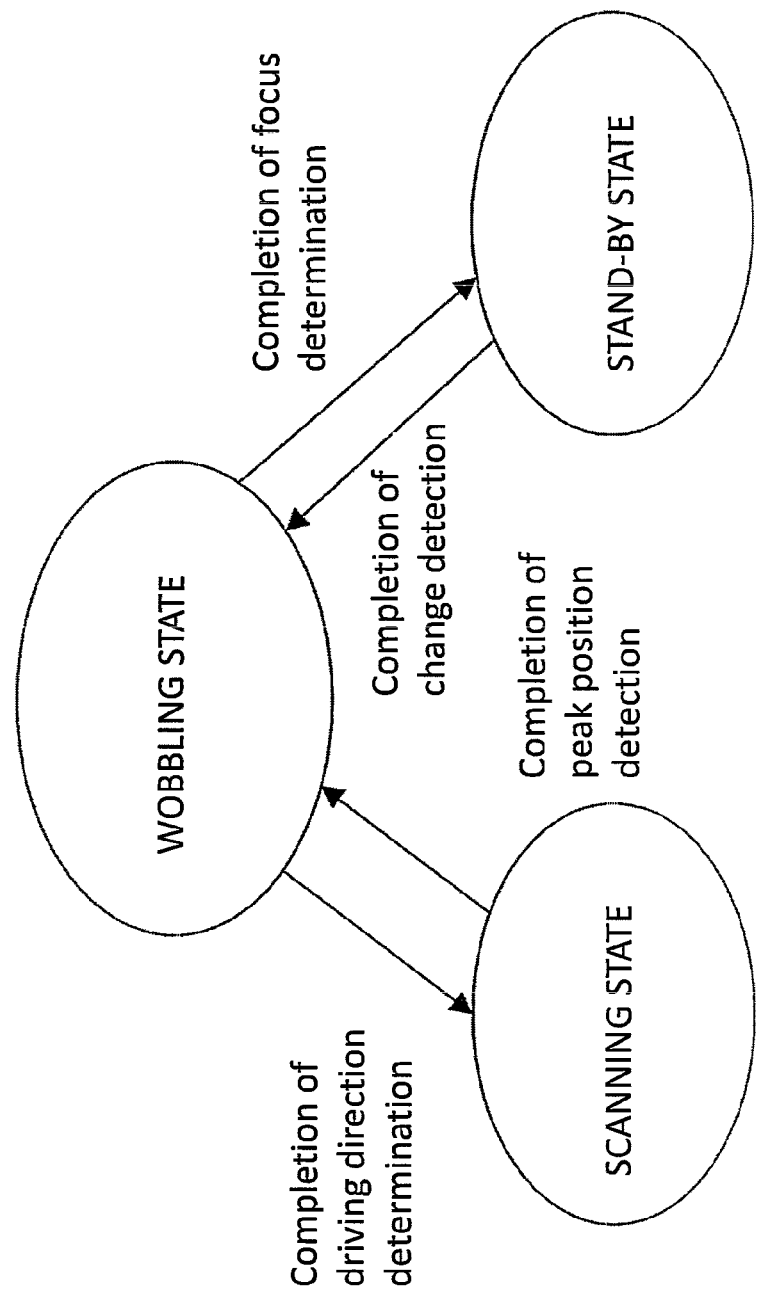
FIG. 5 is a drawing illustrating a state transition in a wobbling drive of the camera according to one embodiment of the invention.

As shown in the state transition diagram of FIG. 5, there are three states in AF for which the wobbling control is used. An AF process is performed while transiting between the wobbling control states. As shown in FIG. 5, there are three states; that is, a wobbling state, a scanning state, and a stand-by state. The wobbling state is, as described above, slight drive of the focus lens 101a toward the wide-angle end and the telephoto end, alternately. The scanning state is the drive of the focusing lens 101a toward the position associated with the peak contrast value. In the stand-by state, neither of the wobbling nor the scanning is executed.

As shown in FIG. 5, the driving direction of the focusing lens 101a is determined when in the wobbling drive. (Recall FIGS. 3A and 3B.) When the direction determination is completed, the state transitions to the scanning state. When the peak position of the contrast value is detected when in the scanning state, the state transitions to the wobbling state and focusing determination is performed by the wobbling drive. When the focusing determination is completed by the wobbling drive, the state transitions to the stand-by state.

Figure 6:
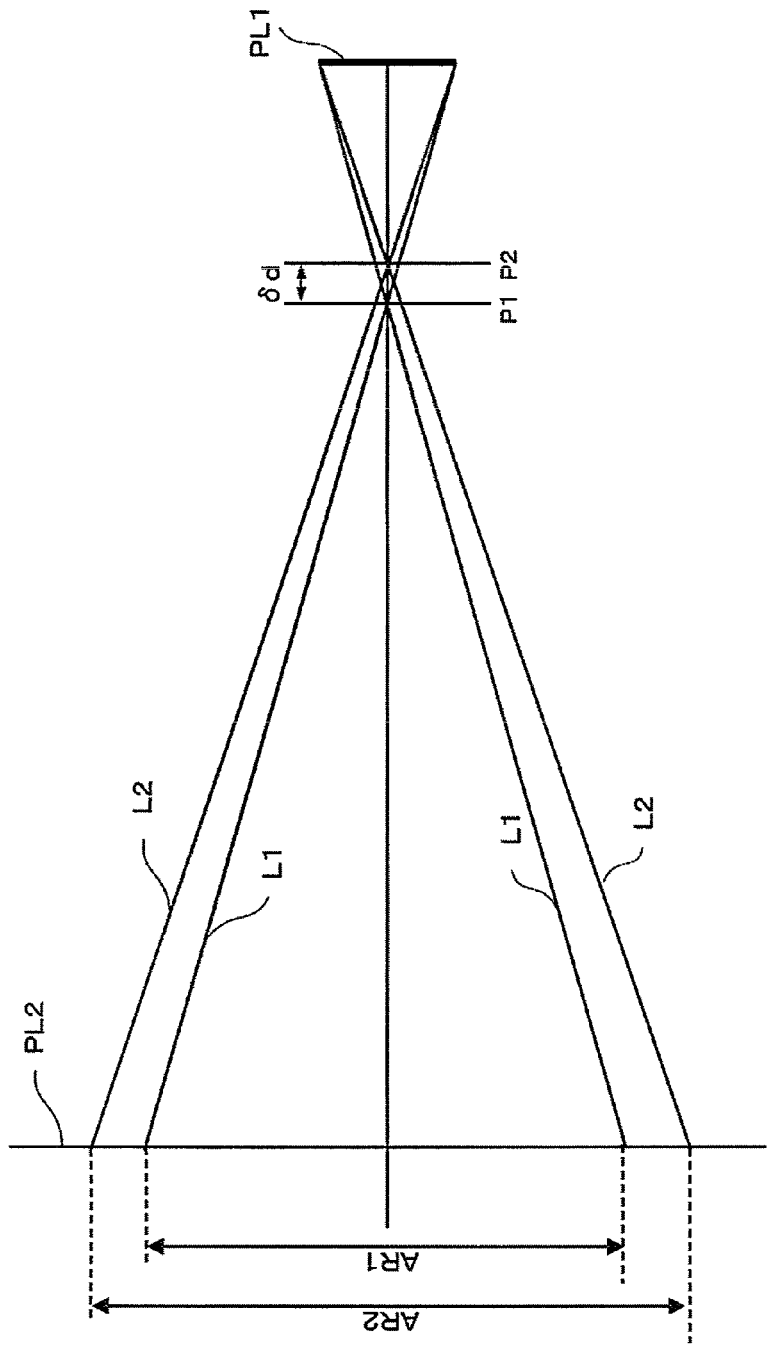
FIG. 6 is a diagram illustrating a definition of image magnification change of the camera according to one embodiment of the invention.

Next, the image magnification change will be described with reference to FIG. 6. The image magnification change is a change ratio of an image magnification per unit change amount of an image formation position generated by the drive of the focusing lens 101a. In FIG. 6, an image pickup plane PL 1 is a plane on the image sensor 201. A plane PL2 is a virtual surface of the focusing lens 101a. The image capturing range changes from an area AR1 to an area AR2 when the focusing lens 101a moves a 6d distance from a P1 to a P2. The change ratio of the image magnification change is a ratio of the AR1 and AR2. The δd approximately corresponds to the change amount of the image formation position. Thus, the ratio of the AR1 and AR2 with respect to the δd corresponds to the image magnification change. That is, the image magnification change can be defined as:

$$\frac{AR1/AR2}{\delta d}$$

Figure 7:
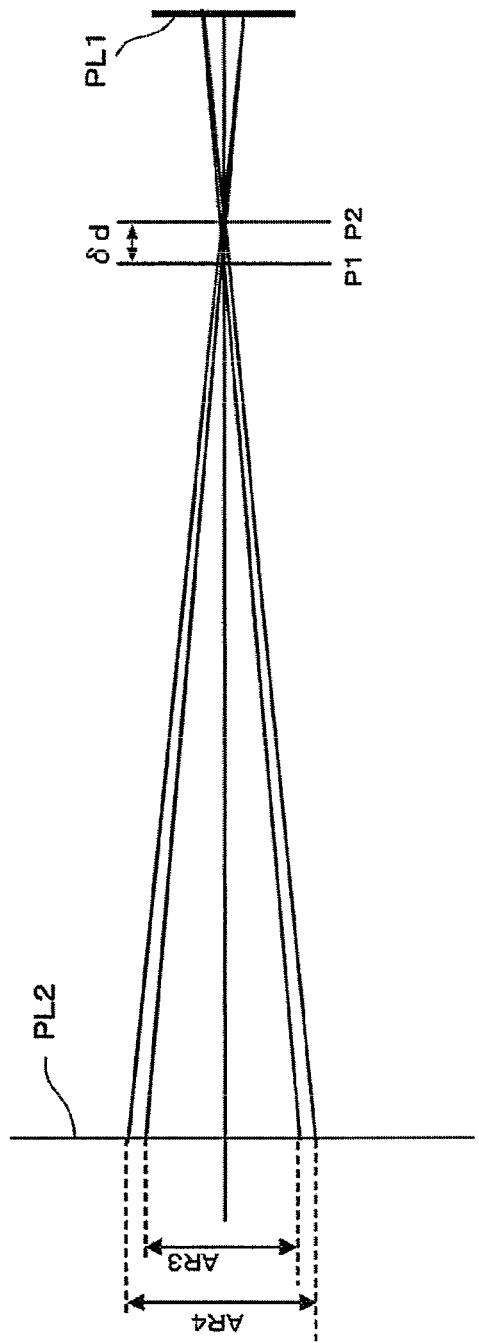
FIG. 7 is a drawing illustrating image magnification change of the camera according to one embodiment of the invention when a central portion is enlarged.
Figure 8:
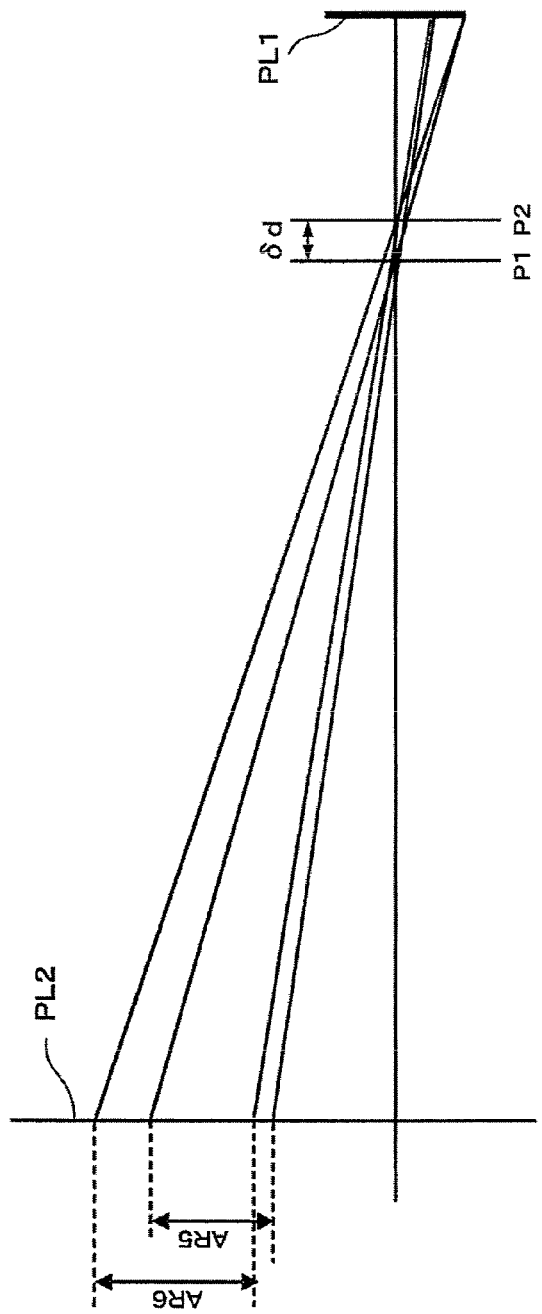
FIG. 8 is a drawing illustrating image magnification change of the camera according to one embodiment of the invention when a peripheral portion is enlarged.

According to the present example embodiment, a portion of the range captured by the image sensor 201 is enlarged (the "enlargement portion") and displayed on the liquid crystal display 207. Further, image data of the moving image is recorded in the recording medium. In this case, the change amount of the image capturing range depends on the position of the area to be recorded in enlargement (the "enlargement area") when the focusing lens 101a is driven (which will be described later with reference to FIGS. 7 and 8). FIG. 7 shows a case where a central portion of the capturing range is enlarged, and FIG. 8 shows a case where a peripheral portion of the image capturing range is enlarged.

In comparing a case where an area AR3 which is a central portion of the virtual plane PL2 is enlarged to an area AR4 (shown in FIG. 7) with a case where an area AR5 which is a peripheral portion of the virtual plane PL2 is enlarged to an area AR6 (shown in FIG. 8), the capturing range changes more largely when the peripheral portion is enlarged.

According to the present embodiment, switching among prohibition, restriction, and allowance (normal wobbling) of wobbling in the wobbling drive is performed in consideration of (i) the position of the enlargement area and (2) the image magnification change of the optical system, so that image deterioration due to the wobbling drive can be prevented.

Figure 9A:
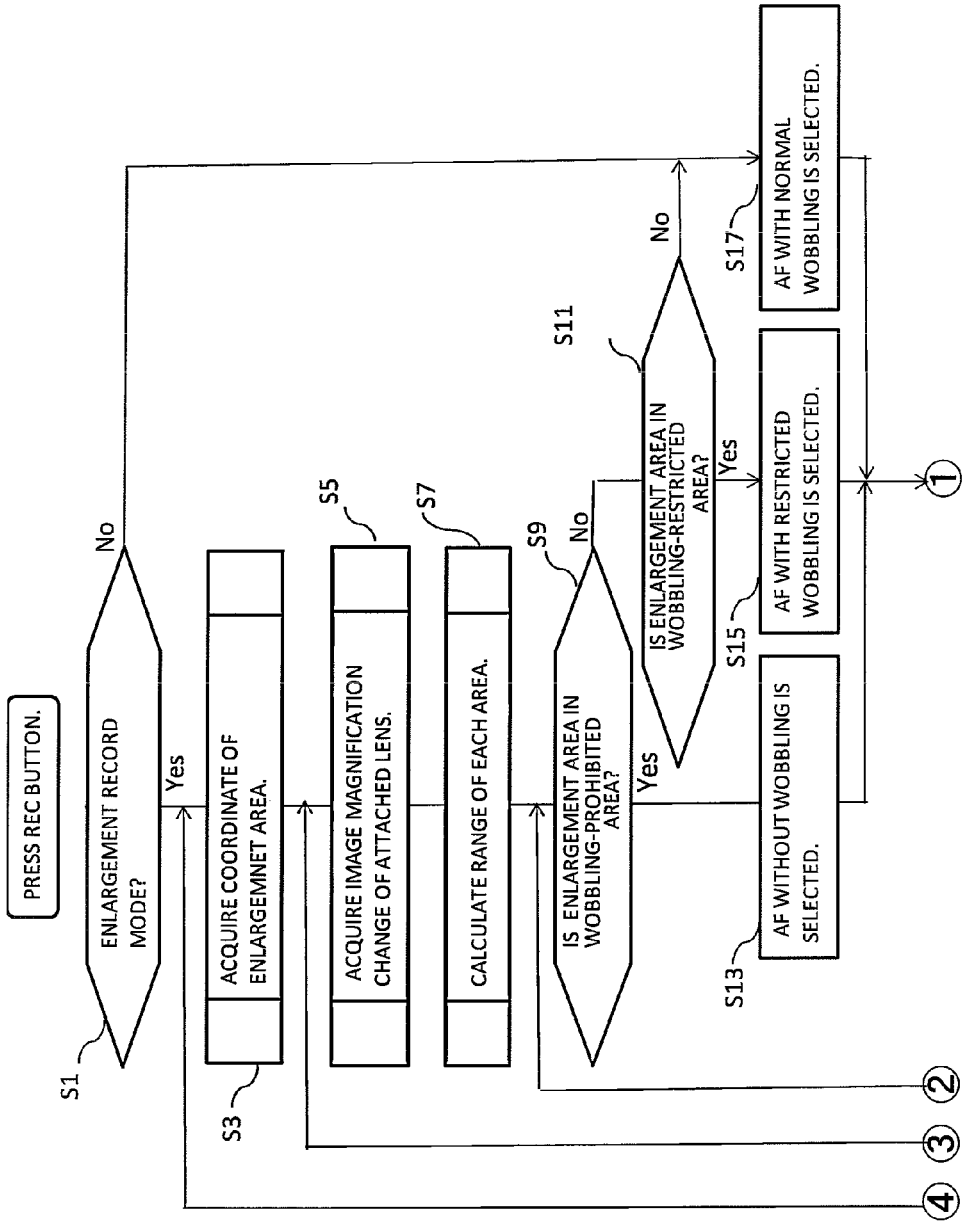
FIGS. 9A and 9B are flowcharts showing an operation of the camera according to one embodiment of the invention.
Figure 9B:
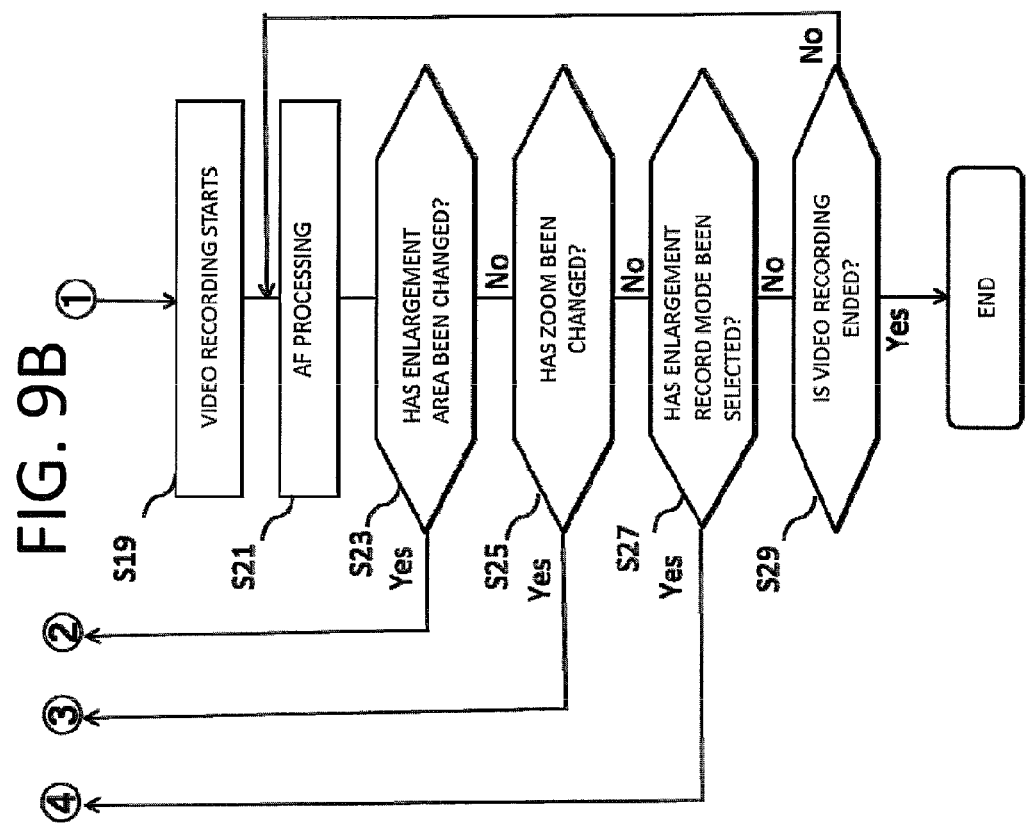

Next, the wobbling control according to the present embodiment will be described with reference to the flowchart of FIGS. 9A and 9B. The flow collectively shown in FIGS. 9A and 9B is executed by the body control unit 205 by directly controlling various units of the camera body 200 and by controlling various units of the interchangeable lens 100 via the lens controlling unit 111. The flow starts when the user presses the movie recording button (REC button) for moving image recording.

After the movie recording button (REC button) of the camera operation input receiving units 209 is pressed, it is determined first whether or not an enlargement record mode has been set (S1). According to the present example embodiment, the enlargement record mode is set by operating the enlarge button of the camera operation input receiving units 209. However, the enlargement record mode need not be set in this way, and may be set in alternative ways. For example, the enlargement record mode may be set in a menu screen.

When it is determined at step S1 that the enlargement record mode has been set, a coordinate of the area to be recorded in enlargement is acquired (S3). The position of the area to be recorded in enlargement can be changed in response to a user operation of the arrow pad of the camera operation input receiving units 209, or a user touch operation on a touch panel overlaying the liquid crystal display 207. At this step, the coordinate of the center position of the area to be recorded in enlargement (the "enlargement area") is acquired. The coordinate of the center position of the enlargement area can be set as a position of the enlargement area. the user need not set the enlargement area by the arrow pad. For example, the user may set the enlargement area by a touch panel. A size of the enlargement area may be constant, or may be widened and/or narrowed in response to a user's instruction.

After the coordinate of the enlargement area is acquired at step S3, the image magnification change of an attached lens is acquired (S5). The image magnification change of the attached interchangeable lens 100 is stored (e.g., either directly, or in a table or equation used to determine it) in the lens-side storage unit 113. The stored image magnification change is sent to the body control unit 205 via the lens controlling unit 111, the lens-side communication unit 115, and the body-side communication unit 215, as a communication between the camera body 200 and the interchangeable lens 100.

After the image magnification change of the attached lens 100 is acquired, a range of each of a plurality of switching areas (used to classify the enlargement area and select a wobbling control type) is calculated (S7). At this step, the image capturing range is divided into three areas; that is, a wobbling-prohibited area (or simply 'a prohibition area'), a wobbling-restricted area (or simply a 'restriction area'), and a normal wobbling area (or simply 'a normal area') in accordance with the image magnification change. The prohibition area, the restriction area, and the normal area are collectively referred to as a wobbling control switching area. As described later, according to the present embodiment, one wobbling control switching area is selected from the three wobbling control switching areas (that is, from (1) the prohibition area, (2) the restriction area, or (3) the normal area) in accordance with the position (center coordinate) of the enlargement area. AF control is then performed based on the selection result.

The switching areas used in selecting the appropriate wobbling control type will be described below. The range of the enlargement area (En) may be rectangle as shown in FIGS. 14A, 14B, 15A and 15B (described later) or some alternative shape such as, for example, a circle. As shown in FIGS. 14A and 14B, the centers of the wobbling control switching areas (the wobbling-prohibited area, the wobbling-restricted area, or the normal wobbling area) coincide with the center of the image capturing range, a part of which is to be recorded in enlargement.

The wobbling switching areas may be determined using a table mapping image magnification change ratios to normal areas, wobbling-restricted areas and wobbling prohibited areas, as shown in FIG. 10. As an example shown in FIG. 10, the image magnification change ratios are classified into four levels, and for each of the four levels, the image capturing range is divided into the normal wobbling area, the wobbling-restricted area, and the wobbling-prohibited area. For example, when the image magnification change is 0.15% and over, the normal-wobbling area is set to a 10% area from a capturing center, the wobbling-restricted area is set to a 50% area from capturing center except the normal wobbling area, and the wobbling-prohibited area is set to an outer area of the wobbling-restricted area (that is, areas other than the normal and wobbling-restricted areas) (See FIG. 14A.)

Alternatively, the wobbling control switching areas may be calculated from the image magnification change. Once the image magnification change is determined, the area from the capturing center of the normal wobbling area can be calculated from the following formula (1).

$$\text{wob\_nor\_area} = \text{wob\_nor\_area\_ref} \times (\text{wob\_mag\_swing\_ref}/\text{wob\_mag\_swing}) \quad (1)$$

where,
wob_nor_area≡An area from the capturing center of the normal wobbling area (%),
wob_nor_area_ref≡A reference value of area from the capturing center of the normal wobbling area (%),
wob_mag_swing≡A ratio of the image magnification change (%), and
wob_mag_swing_ref≡A reference value of the image magnification change ratio (%).

Thus, for example, when the image magnification change is 0.2%, the area from the capturing center of the normal wobbling area 'wob_nor_area' is calculated to be 10%, as shown below.

$$10\% = 40\% \times (0.05\%/0.20\%)$$

where,
wob_nor_area_ref=40(%), and
wob_mag_swing_ref=0.05(%).

In a case where the interchangeable lens 100 is a zoom lens, the image magnification change ratio depends on a focal length of the lens, and the switching areas are determined after acquiring the image magnification change ratio in accordance with the focal length acquired from the interchangeable lens 100. That is, the image magnification change ratios in accordance with the focal lengths are stored in the lens-side storage unit 113 in advance. The image magnification change ratio is then read out in accordance with the focal length detected by the zoom position detecting unit 109, and then sent to the camera body 200 by communication via the lens controlling unit 114 and the lens-side communication unit 115. The camera body 200 sets the normal wobbling area, the wobbling-restricted area, and the wobbling-prohibited area based on the image magnification change ratio as applied to the above described table or converting equations.

In a case where a value of the image magnification changes, the switching areas may be determined using a table or a converting equation for each position in the optical axis direction of the zoom lens.

Alternatively, sizes of the switching areas of the wobbling control may be corrected in accordance with the magnification ratio. For example, a magnification ratio of 4 times is used as a reference. When the magnification ratio is large, the size of the normal wobbling area may be set small. Conversely, when the magnification ratio is small, the size of the normal wobbling area may be set large. Thus, the size of the normal wobbling area is an inverse function of the magnification ratio.

The size correction of the normal wobbling area in accordance with the magnification ratio may be calculated by the following formula (2), for example:

$$\text{wob\_nor\_area\_correct} = \text{wob\_nor\_area} \times (\text{mag\_ratio\_ref}/\text{mag\_ratio}) \quad (2)$$

wherein,
wob_nor_area_correct≡An area from the capturing center of the normal wobbling area corrected in accordance with the magnification ratio (%),
mag_ratio≡A magnification ratio (without a unit), and
mag_ratio_ref≡A reference value of a magnification ratio (without a unit)

As an example, when the magnification ratio is 8 times, the area from the capturing center of the normal wobbling area is calculated to be 10% as follows.

$$10\% = 20\% \times (4/8)$$

where,
wob_nor_area=20%, and
mag_ratio_ref=4.

Referring back to FIG. 9A, after the range of each area is calculated at step S7, it is determined next whether or not the (e.g., center of the) set enlargement area is in the wobbling-prohibited area (S9). Here, with respect to the range of the area calculated at step S7, it is determined based on the current position of the enlargement area and image magnification change (which is (or was) used to define the wobbling-prohibited area) whether or not the set enlargement area is in the wobbling-prohibited area.

When it is determined at step S9 that the set enlargement area is in the wobbling-prohibited area, AF without wobbling is selected (S13). In this case, image deterioration that would be caused were the wobbling drive to be used during AF would be large since the image magnification change is large and the enlargement area in the image capturing range is in a periphery area. Accordingly, wobbling is prohibited during AF so that such image deterioration can be avoided.

On the other hand, when it is determined at step S9 that the set enlargement area is not in the wobbling-prohibited area, it is determined whether or not the enlargement area is in the wobbling-restricted area (S11). Here, it is determined based on the (e.g., center of the) current position of the enlargement area and image magnification change (which is (or was) used to define the wobbling-restricted area) whether or not the set enlargement area is in the wobbling-restricted area.

When it is determined area at step S11 that the position of the area to be recorded in enlargement is in the wobbling-restricted area, AF with restricted-wobbling is selected (S15). If the same drive as the normal wobbling drive were to be performed here, image deterioration would be caused. Accordingly, the restricted-wobbling drive is performed instead. The restricted-wobbling drive will be described with reference to FIGS. 11A-11C, 12A-12C, 13A and 13B.

Figure 11B:
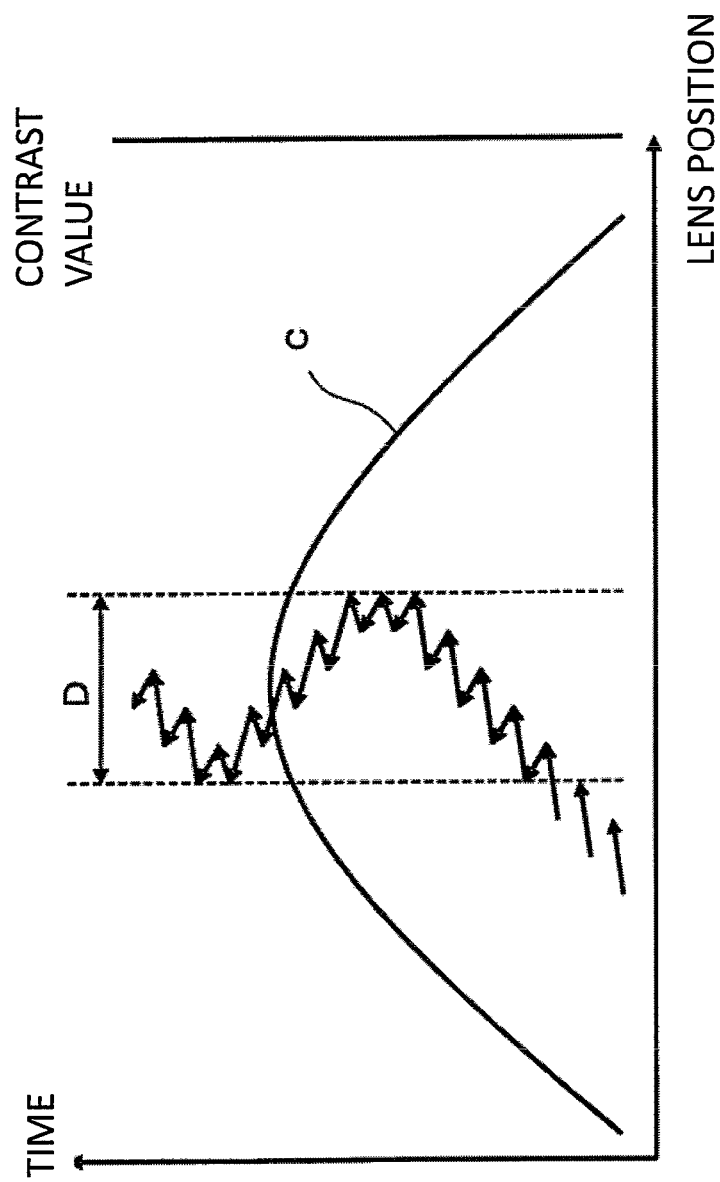
FIGS. 11B and 11C are graphs showing how focusing is performed by restricted-wobbling drive, in the camera according to one embodiment of the invention.
Figure 11C:
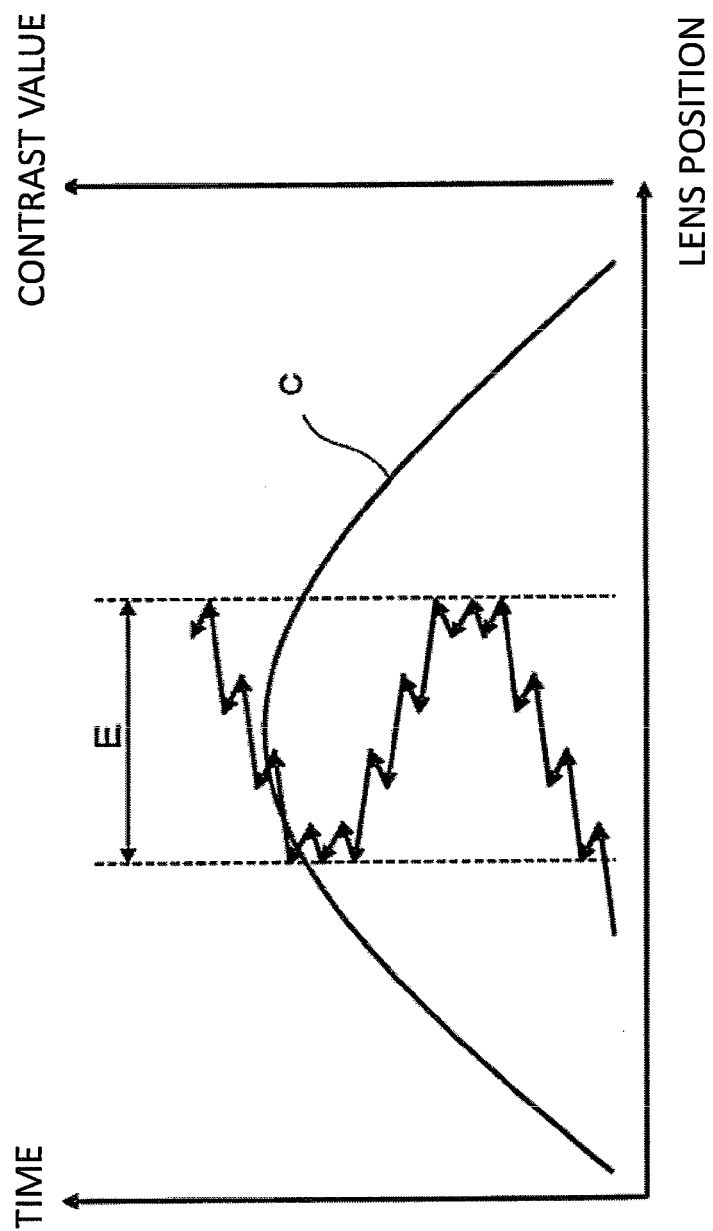

FIGS. 11A to 11C show examples of performing the restricted-wobbling by controlling the displacement amount 'B' of the wobbling control. When it is assumed that, as shown in FIG. 11A, the focus lens 101a is displaced forward and backward by 10 pulses in the normal wobbling area, the focus lens 101a is displaced by one to nine pulses in the restricted-wobbling area. In this case, a restriction ratio may be changed in proportion to the image magnification change and/or the coordinate of the (e.g., center of the) position of the enlargement area.

FIGS. 11B and 11C show examples of focusing by wobbling displacement. In FIG. 11B, the displacement amount is '1', and in FIG. 11C, the displacement amount is '2'. As seen from the figures, a net or cumulative wobbling displacement amount 'D' (that is, a sum of wobble displacements amounts before direction is changed) shown in FIG. 11B is smaller than a net wobbling displacement amount 'E' shown in FIG. 11C. Comparing 'D' of FIG. 11B with 'E' of FIG. 11C, notice that the total wobbling displacement amount becomes smaller by reducing the wobbling displacement amount. By reducing the total wobbling displacement amount, image deterioration due to the wobbling drive can be prevented or at least reduced. That is, the wobbling can be restricted by reducing the displacement amount in the wobbling drive.

Figure 12B:
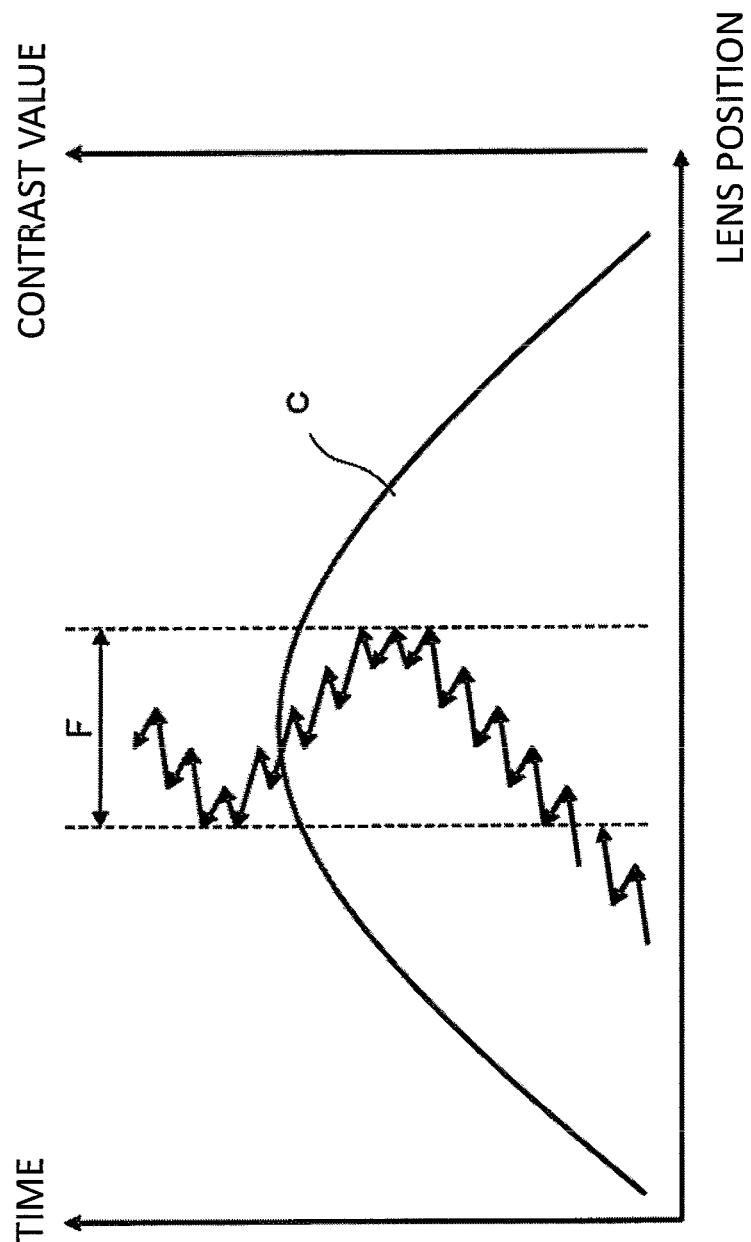

FIGS. 12A to 12C show examples of performing the restricted-wobbling by controlling the amplitude amount 'A' (as opposed to the displacement amount) of the wobbling control. In FIGS. 12B and 12C, similarly to the case of FIGS. 11B and 11C, it is assumed that the focus lens 101a is displaced forward and backward by 10 pulses by the wobbling drive (see FIG. 12A) in the normal wobbling area. The focus lens 101a is displaced by one to nine pulses by the wobbling drive in the wobbling-restricted area. In this case, the restriction ratio may be changed in proportion to the image magnification change and/or the coordinate of the (e.g., center of the) position of the enlargement area.

FIGS. 12B and 21C show examples of focusing by the wobbling drive. In FIG. 12B, the amplitude amount is '1', and in FIG. 12C, the amplitude amount is '2'. As seen from the figures, a net wobbling displacement amount 'F' shown in FIG. 12B is smaller than a net wobbling displacement amount 'G' shown in FIG. 12C. Comparing 'F' of FIG. 12B with 'G' of FIG. 12C, notice that the total wobbling displacement amount becomes smaller by reducing the wobbling amplitude amount. By reducing the total wobbling displacement amount, image deterioration due to the wobbling drive can be prevented or at least reduced. The wobbling can be restricted by reducing the amplitude amount 'A' in the wobbling drive.

Performing the above-described wobbling control enables AF performance and image quality to be properly balanced. However, reducing the displacement amount and/or the amplitude amount of the wobbling to eliminate or reduce image deterioration makes the direction determination by the wobbling more difficult. Accordingly, according to the present example embodiment, a threshold for direction determination of the scan drive is lowered in the wobbling-restricted area, which will be described with reference to FIGS. 13A and 13B.

Figure 13A:
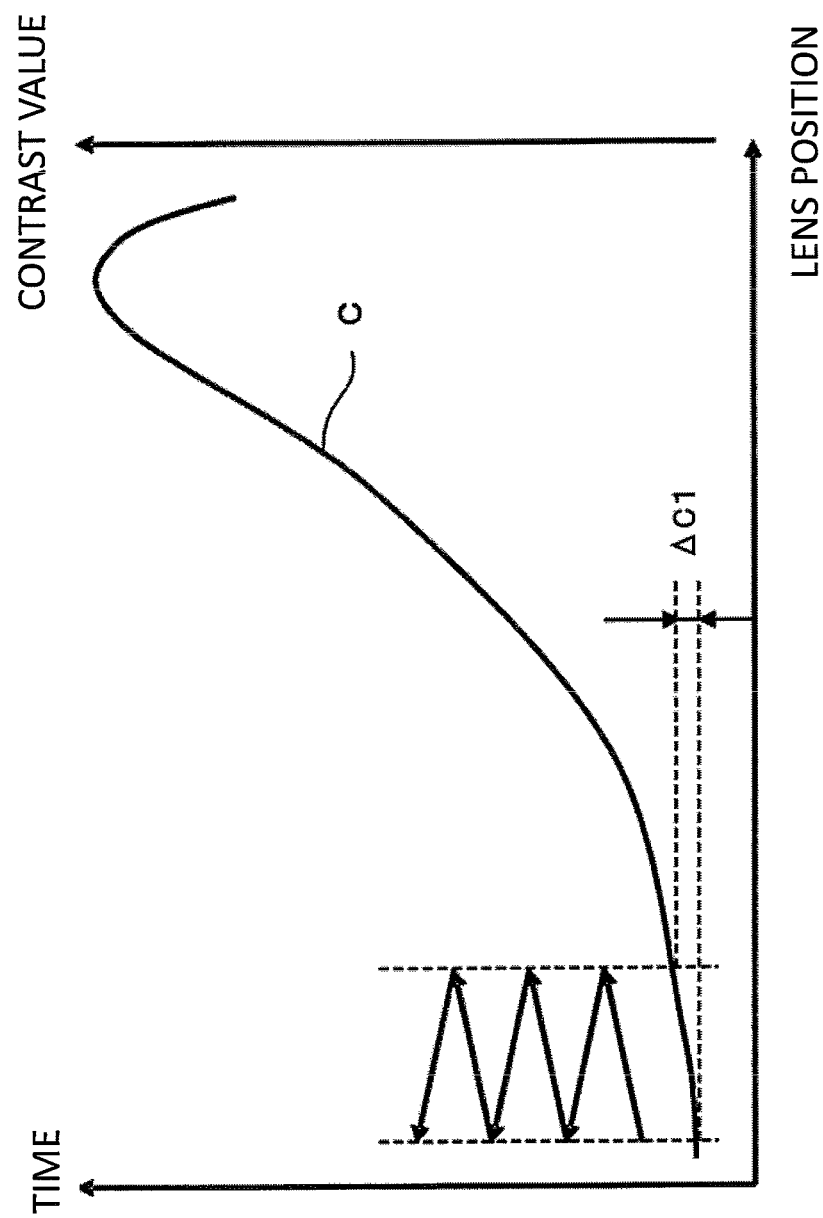
FIGS. 13A and 13B are graphs showing a relationship between an amplitude amount of wobbling and a contrast change ratio of the camera according to one embodiment of the invention.
Figure 13B:
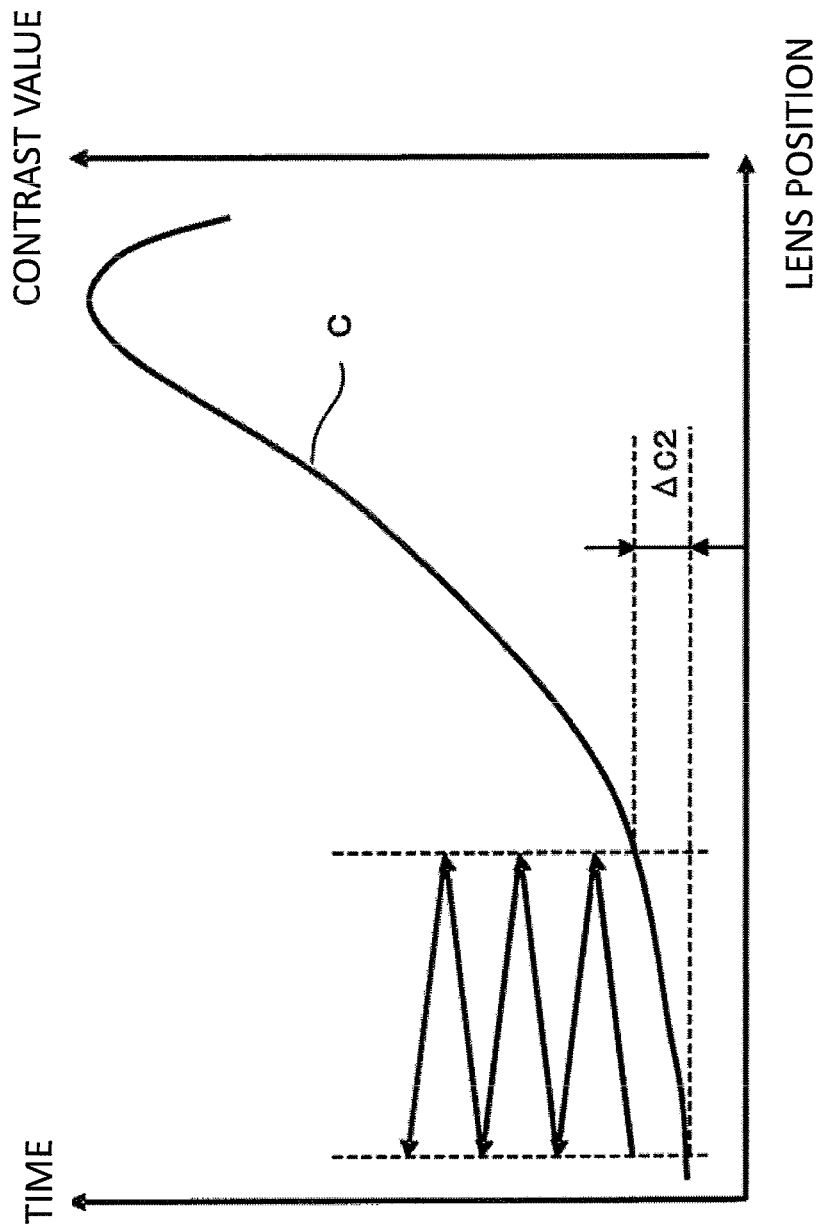

FIG. 13A shows the wobbling drive when the amplitude amount is small. FIG. 13B shows the wobbling drive when the amplitude amount is large. As shown in FIG. 13A, a detectable contrast change amount is ΔC1 when the amplitude amount is small. As shown in FIG. 13B, the detectable contrast change amount is ΔC2 when the amplitude amount is large (ΔC1<ΔC2). That is, in case the amplitude amount is small, the detectable contrast change amount is small, and so the direction determination is difficult in the scan drive.

According to the present example embodiment, the threshold for direction determination of the scan drive is lowered to make the direction determination easy when the amplitude amount is small. The lens-side storage unit 113 may store a predetermined threshold in advance which is used when determining the displacement direction of the position of the focusing lens 101a in the wobbling drive. The predetermined threshold is, for example, a change amount of contrast.

When the displacement direction of the focusing lens 101a is determined and the image magnification change is equal to or over a predetermined value, the threshold for determining the displacement direction of the position of the focus lens 101a by the wobbling drive is set smaller in accordance with the position of the enlargement area in the image capturing range, relative to the threshold when the image magnification change is smaller than the predetermined value. Specifically, for example, when the image magnification change is equal to or over the predetermined value and the position of the area to be recorded in enlargement is in the wobbling-restricted area, the threshold is set to a smaller than normal value. Alternatively, or in addition, when the image magnification change is equal to or over the predetermined value and the (e.g., center of the) position of the enlargement area is nearer to the periphery, the threshold is set to a smaller than normal value.

In this case, when the position of the (e.g., center of the) enlargement area is in the wobbling-restricted area, the threshold value is set smaller than that the normal threshold value, which is used when the position of the (e.g., center of the) enlargement area is in the normal wobbling area, for example.

Alternatively, a predetermined threshold may be stored in advance which determines the displacement direction of the position of the focusing lens 101a in the scan drive. The predetermined threshold is, for example, the change amount of contrast. When the displacement direction of the focusing lens 101a is being determined, if the image magnification change is equal to or over the predetermined value, the threshold for determining the displacement direction of the focusing lens 101a position by the scan drive may be set smaller, in accordance with the position of the (e.g., center of the) enlargement area in the image capturing range, than the threshold used when the image magnification change is smaller than the predetermined value. Specifically, for example, when the image magnification change is equal to or over the predetermined value and the position of the (e.g., center of the) enlargement area is in the wobbling-restricted area, the threshold is set smaller than normal. More specifically, when the image magnification change is equal to or over the predetermined value and the position of the (e.g., center of the) enlargement area is nearer the periphery, the threshold is set to a smaller value than normal. In this case, when the position of the (e.g., center of the) enlargement area is in the wobbling-restricted area, the displacement direction threshold is set to a smaller value than then the displacement direction threshold used when the position of the (e.g., center of the) enlargement area is in the normal wobbling area, for example.

Referring back to the flowchart of FIG. 9A, when it is determined at step S11 that the (e.g., center of the) enlargement area is not in the wobbling-restricted area or when it is determined at step S1 that the enlargement record mode has not been set, AF with the normal wobbling drive is selected (S17).

As described above, one of (A) AF without wobbling, (B) AF with the restricted-wobbling, or (C) AF with the normal wobbling is selected at step S13, S15, or S17, respectively. That is, as shown in FIGS. 14A and 14B, the wobbling control switching area that includes the center coordinate of the enlargement area is set as the wobbling drive switching area of the enlargement area.

In examples shown in FIGS. 14A and 14B, a rectangular normal wobbling area WoAr1 is arranged at the center of the image capturing range, a rectangular wobbling-restricted area WoAr2 is arranged outside the area WoAr1 (and excludes the area WoAr1), and a rectangular wobbling-prohibited area WoAr3 is arranged further outside (and excludes both areas WoAr1 and WoAr2).

In FIGS. 14A and 14B, an enlargement record area En is an area to be recorded in enlargement as moving images. An image capturing range 201a is area to be captured by the image sensor 201. The wobbling-prohibited area WoAr3 is in a peripheral area of a moving image photographing range, where the wobbling is not used during AF. The wobbling-restricted area WoAr2 is between the wobbling-prohibited area WoAr3 and the normal wobbling area WoAr1, where the wobbling amplitude amount 'A' and/or the displacement amount 'B' are restricted in the wobbling control used during AF. The normal wobbling area WoAr1 is in a center portion of the moving image photographing range, where the normal wobbling is performed during AF.

In the example shown in FIG. 14A, the AF with the restricted-wobbling is selected since the center coordinate EnC of the enlargement area En is within the wobbling-restricted area WoAr2. In the example shown in FIG. 14B, the AF with the normal wobbling is selected since the center coordinate EnC of the enlargement area En is within the normal wobbling area WoAr1.

Referring back to the flowchart of FIGS. 9A and 9B, after one of the three alternative AF operations is selected at step S13, S15, or S17, moving image recording starts (S19). Here, the image signal from the image sensor 201 is image-processed by the image sensor IF circuit 203, the image processing unit 213, and the like for the moving image recording, and then stored in a recording medium.

After the moving image recording starts, the AF processing is performed (S21). Here, a contrast value is calculated in accordance with the type of AF selected at step S13, S15, or S17, based on the image signal from the image sensor 201. The focusing is performed by moving the focus lens 101a so as to provide the peak of the contrast value. Simultaneously the wobbling control used during AF is performed in accordance with selection at step S13, S15, or S17.

After the AF processing is performed at step S21, it is determined at steps S23 and later steps whether or not a shooting condition has been changed during the moving image recording. If so, the type of wobbling used during further AF might have to be changed. First, it is determined whether or not the enlargement area has been changed (S23). If the position of the (e.g., center of the) enlargement area can be changed, it is determined here whether the position of the (e.g., center of the) enlargement area has been changed, based on the operation condition of an operation member (such as user manipulation of an arrow keypad or a touch screen for example) for changing the position of the enlargement area. If the size of the enlargement area can be changed, it is determined whether the size of the enlargement area has been changed, based on an operation condition of an operation member. In any of these cases, the coordinate position due to the change of the enlargement area is acquired (although a reevaluation is not strictly necessary if the center position remains the same). When it is determined that the enlargement area has been changed, the process returns to step S9 (already described above). That is, the wobbling control is performed in accordance with the changed enlargement area.

When it is determined at step S23 that the enlargement area has not been changed, it is determined next whether or not the zoom state has been changed (S25). In case of a zoom lens, the image magnification change changes as the focal length changes. Therefore, when a zoom lens is attached and change of the focal length is detected, the image magnification change again is recalculated, the wobbling control switching areas are re-set, and a classification (i.e., wobbling-prohibited, wobbling-restricted, or normal wobbling) for the wobbling control switching area of the enlargement area is determined using the re-determined control switching areas. At this step, the wobbling control switching areas are re-determined based on focal length information from the zoom position detecting unit 109 of the interchangeable lens 100. When it is determined that the focal length has changed, the process returns to step S5 (already described above). That is, the wobbling control in accordance with the change of the focal length is performed.

When it is determined at step S25 that the zoom state has not changed, it is determined whether or not the enlargement record mode has been selected (S27). If it was determined at step S1 that the enlargement record mode has not been selected so that the AF with the normal wobbling is selected (Recall S17.), and if the user operates the enlargement button or the like while the moving image recording is in progress, the mode is changed to the enlargement record mode. At step S25, whether the mode has been changed to the enlargement record mode is determined based on the operation condition of the operation member and the like. When it is determined that the mode has been changed to the enlargement record mode, the process returns to step S3 (already described above).

When it is determined at step S27 that the enlargement record mode has not been selected (or more precisely, is not currently selected), it is determined whether or not the moving image recording has been ended (S29). Whether the moving image recording has been ended is determined based on the operation condition of the operation member (e.g., a movie recording button) since the user can provide a manual input to end the moving image recording.

When it is determined at step S29 that the moving image recording has not been ended, the process returns to step S21. In this period, the AF process by the wobbling control selected at step S13, S15, or S17 continues to be performed, and then the AF process is only changed in accordance with any changes in the shooting condition determined at steps S23, S25, and/or S27. Note that even if a shooting condition is determined to have changed at step S23, S25 and/or S27, the type of wobbling used during AF might not change (or it might). However, a determined change in shooting condition means that a reevaluation is needed to determine whether a new type of wobbling is to be used during AF. On the other hand, when it is determined at step S29 that the moving image recording has been ended, the flow shown in FIGS. 9A and 9B ends.

Next, changing a threshold used for detecting a change of the shooting condition (for example due to change in the enlargement area, a change in the zoom, and/or a selection of enlargement record mode) will be described when the wobbling control is in the standby state while the process of the flowcharts shown in FIGS. 9A and 9B is executed. In the present example embodiment, when the wobbling control is in the standby state and any change of the shooting condition is detected, the state transits from the standby state to a wobbling state. When the enlargement area is in the wobbling-prohibited area or the wobbling-restricted area under a condition that the image magnification change is large, the threshold for detecting the change of the shooting condition may be set large. Accordingly, transition to the wobbling state and the image deterioration due to the image magnification change are prevented, thereby improving the appearance of moving image AF.

The following are examples of changes that cause a transition from the standby state to the wobbling state:
(1) Change of contrast information;
(2) Change of a motion vector in the capturing range; and
(3) Change of camera movement in a pan direction or a tilt direction using a gyro sensor or the like.
When a change in any of the above-described shooting conditions is detected and the enlargement area is in the wobbling-prohibited area or the wobbling-restricted area, a threshold for transiting from the standby state to the wobbling state is set large to prevent transition to the wobbling state. In case of change of contrast information, for example, the AF control by the wobbling control is performed in the event of a large deviation from an in-focus state by setting the threshold to a value smaller when the enlargement area is in the wobbling-restricted area or the wobbling-prohibited area than a threshold value used when the enlargement area is in the normal wobbling.

Additionally, according to the present example embodiment, the wobbling drive control unit (the body control unit 205, the lens controlling unit 111, the lens driving unit 103, and the like) executes the wobbling drive at a predetermined frequency. When the image magnification change is equal to or over the predetermined value, the frequency of the wobbling drive is reduced in accordance with the position of the (e.g., center of the) enlargement area in the image capturing range, relative to the frequency when the image magnification change is smaller than the predetermined value. Specifically, for example, when the image magnification change is equal to or over the predetermined value and the position of the (e.g., center of the) enlargement area is in the wobbling-restricted area, the frequency of the wobbling drive is reduced. More specifically, when the image magnification change is equal to or over the predetermined value and the position of the (e.g., center of the) enlargement area is nearer the periphery, the frequency of the wobbling drive is reduced. In these cases, the frequency of the wobbling drive is reduced when the position of the (e.g., center of the) enlargement area is in the wobbling-restricted area, and is smaller than the frequency when the position of the (e.g., center of the) enlargement area is in the normal wobbling area, for example.

Alternatively, the enlargement area may be shifted in accordance with displacement of the wobbling drive. Deterioration of the appearance of the moving image due to the image magnification change can be prevented by shifting the enlargement area so that the enlargement area is positioned between the center area and the periphery area in accordance with change of the position of the focus lens 101a due to the wobbling drive.

FIGS. 15A and 15B show that the enlargement area En is shifted in accordance with the displacement of the wobbling drive. FIG. 15A shows the enlargement area En in the image capturing range 201a. As shown in FIG. 15B, the enlargement area En may be moved to an enlargement area En1 or an enlargement area En2 in accordance with a change of the position of the focus lens 101a. The enlargement area can be moved by shifting a cropping position of the image in the area to be recorded in enlargement.

That is, according to the present example embodiment, when the image magnification change is equal to or over the predetermined value and the image is moved in response to the displacement of the lens position due to the wobbling drive, the position of the enlargement area in the image capturing range is moved to a position where the cropped image from a portion of the image capturing range is generated. This shift in the position of the enlargement area is, based on the movement of the image and the position of the (e.g., center of the) enlargement area in the image capturing range.

According to the above-described embodiment, the image magnification change depends only on the zoom position of the attached lens. The value of the image magnification change is looked up from values stored in the lens-side storage unit 113 in advance (or alternatively calculated from an equation stored in the lens-side storage unit 113 in advance) and sent to the camera body 200 to switch the wobbling control. However, the present invention can be also applied to a case where the image magnification change is stored for each area of an optical image surface at each zoom position in the attached interchangeable lens 100. This modification will be described with a reference to FIGS. 16A and 16B. In this case, the wobbling control depends on the image magnification change of each coordinate of the enlargement area.

FIG. 16A is a flow diagram of a process in which the value of the image magnification change is not acquired for each coordinate of the enlargement area. Numbers of the steps in FIG. 16A match those of FIGS. 9A and 9B, and detailed descriptions about such steps are omitted.

FIG. 16B is a flow diagram in which the value of the image magnification change for each coordinate of the enlargement area is mainly used. The process of FIG. 16B is similar to that of FIG. 16A except that step S4 of FIG. 16B replaces step S5 of FIG. 16A. More specifically, according to the present modification of FIG. 16B, the lens-side storage unit 113 stores the image magnification change for each zoom position and coordinate, and the information can be looked up and sent to the camera body 200.

After the coordinate of the enlargement area is acquired at step S3, the image magnification change is acquired for each coordinate of the enlargement area of the attached interchangeable lens 100 at step S4. Here, the coordinate of the enlargement area is sent from the camera body 200 to the interchangeable lens 100, and the image magnification change for each coordinate of the enlargement area is acquired from the interchangeable lens 100.

After the image magnification change is acquired for each coordinate of the enlargement area at step S4, a range of each area is calculated (S7), the wobbling control is selected (S9, S11, S13, S15, S17), and then moving image recording starts (S19).

In selecting the wobbling control to be used by the AF at steps S13, S15, or S17, a table such as the one shown in FIG. 16C may be used. In an example table shown in FIG. 16C, one of AF without the wobbling, the AF with the restricted-wobbling, or the AF with the normal wobbling is selected in accordance with the image displacement amount calculated based on the image magnification change for each coordinate of the area to be recorded in enlargement at step S4.

As described above, according to an example embodiment consistent with the present invention, the lens-side storage unit 113 (which stores the information regarding the image magnification change of the optical system due to the movement of the focus lens 101a) and the wobbling drive control unit (which includes the body control unit 205, the lens controlling unit 111, the lens driving unit 103, and the like, and which controls the wobbling drive of the focus lens 101a in the image capturing range) are provided to record a portion of the image capturing range of the image sensor 201 in enlargement. The wobbling drive control unit controls the wobbling drive based on the information regarding the position of the enlargement area and the image magnification change. (See steps S3 to S17 in FIG. 9A.) Accordingly, the balance between the AF performance and the appearance of the moving image can be optimized regardless of the enlargement area in the moving image. That is, an optimum wobbling drive is selected in accordance with the position of the enlargement area and/or the image magnification change. In this way, the balance between the AF performance and the appearance of the moving image can be optimized.

Additionally, according to an example embodiment consistent with the present invention, the wobbling drive control unit prohibits the wobbling drive in accordance with the position of the enlargement area in the image capturing range when the image magnification change is equal to or over the predetermined value. (Recall, e.g., steps S3, S5, S7, S9, and S13 of FIG. 9A). The wobbling drive is prohibited so that deterioration of the appearance of the moving image can be prevented.

Additionally, according to an example embodiment consistent with the present invention, when the image magnification change is equal to or over the predetermined value, the wobbling drive control unit reduces the amplitude of the wobbling drive in accordance with the position of the enlargement area to be recorded in the image capturing range, relative to the amplitude when the image magnification change is smaller than the predetermined value. (Recall, e.g., steps S3, S5, S7, S11, and S15 of FIG. 9A, as well as FIG. 12.) The restricted-wobbling drive is performed so that deterioration of the appearance of the moving image can be prevented or at least reduced, and the AF performance can be assured.

Additionally, according to an example embodiment consistent with the present invention, when the image magnification change is equal to or over the predetermined value, the wobbling drive control unit reduces the displacement amount of the lens position at the center of the amplitude of the wobbling drive in accordance with the position of the enlargement area in the image capturing range, relative to the displacement amount when the image magnification change is smaller than the predetermined value. (Recall, e.g., FIG. 4, steps S3, S5, S7, S11, and S15 of FIG. 9A, and FIG. 11.) The restricted-wobbling drive is performed so that deterioration of the appearance of the moving image can be prevented or at least reduced, and the AF performance can be assured.

Additionally, according to an example embodiment consistent with the present invention, when the image magnification change is equal to or over the predetermined value to determine the displacement direction of the lens position using the threshold, the wobbling drive control unit reduces the threshold for determining the displacement direction of the lens position in accordance with the position of the enlargement area in the capturing range, relative to the threshold when the image magnification change is smaller than the predetermined value. (Recall, e.g., FIG. 13.) Accordingly, direction determination of the scan can be accurately performed even when the displacement amount and/or the amplitude amount of the wobbling is reduced.

Additionally, according to an example embodiment consistent with the present invention, the wobbling drive control unit (the body control unit 205, the lens controlling unit 111, the lens driving unit 103, and the like) executes the wobbling drive at a predetermined frequency. When the image magnification change is equal to or over the predetermined value, the wobbling drive control unit reduces the frequency of the wobbling control in accordance with the position of the enlargement area in the image capturing range, relative to the frequency when the image magnification change is smaller than the predetermined value. Accordingly, the frequency of the wobbling drive can be reduced.

Additionally, according to an example embodiment consistent with the present invention, the body-side storage unit 211 stores information regarding the image magnification change in a form of a table or a converting equation, either of which defines a relationship between the position of the enlargement area in the image capturing range to be recorded and the image magnification change. Calculation time can be reduced by using a table, while memory use can be reduced by using the converting equation.

Additionally, according to the one example embodiment of the invention, when the image magnification change is equal to or over the predetermined value, the image is moved in response to the displacement of the lens position due to the wobbling drive, in accordance with the position of the enlargement area in the image capturing range. Based on the movement of the image, the wobbling control unit adjusts the position of the enlargement area in the image capturing range to a position where the cropped image from a portion of the image capturing range is generated. The cropping position of the image is moved when the position of the image is moved due to the wobbling drive so that a stable image can be acquired.

Additionally, according to an example embodiment consistent with the present invention, the optical system includes the zoom lens 101*b* and the focusing lens 101*a*, the zoom position detecting unit 109, and the wobbling drive control unit. The zoom position detecting unit 109 detects the position of the zoom lens 101*b* in the optical axis direction. The wobbling drive control unit controls the wobbling drive based on the information regarding the zoom position, the position of the enlargement area, and the image magnification change. Accordingly, in even in the case of the zoom lens being driven, an optimum wobbling drive is selected in accordance with the position of the enlargement area and the image magnification change so that the balance between the AF performance and appearance of the moving picture can be optimized.

Additionally, according to an example embodiment consistent with the present invention, the wobbling control is changed in accordance with the enlargement area. When the enlargement area is near the center area, the wobbling drive is performed as normal. When the enlargement area is in a peripheral area, the restricted-wobbling is performed (or is prohibited).

With an example embodiment consistent with the present invention, performing the wobbling control at the time of recording the moving image has been described. However, example embodiments consistent with the present invention are not limited to this. For example, the wobbling control may be performed currently with live-view display, regardless of whether or not the moving image is recorded.

Additionally, according to an example embodiment consistent with the present invention, the wobbling control switching area is classified into one of three classes; namely the wobbling-prohibited area, the wobbling-restricted area, and the normal area. However, it is also possible to classify the wobbling control switching area into one of only two area classes (without one of the three area classes described), or to add one or more another area classes to be processed by different control.

With an example embodiment consistent with the present invention, the camera to which an interchangeable lens is attached has been described. However, the present invention is not limited to this. Thus, example embodiments consistent with the present invention can be applied to cameras whose lens barrel is fixed on the body.

With an example embodiment consistent with the present invention, the device for taking pictures has been described as a digital camera. However, example embodiments consistent with the present invention can be used with alternative devices for talking pictures, such as, for example, a digital single lens reflex camera, a compact digital camera, a camera for taking movies such as a video camera, a camera incorporated into a mobile phone, a camera incorporated into a mobile information terminal (PDA: Personal Digital Assistant), a camera incorporated into a game console, and the like. Generally, example embodiments consistent with the present invention can be applied to any device or apparatus that performs wobbling control.

Regarding the techniques described in this specification (for example, the control described using the flowcharts), most of the control can be specified using a program of processor-executable instructions. Such a control program may be recorded in a (e.g., non-transitory) recording medium or a recording unit. The control program may be recorded in a recording medium or a recording unit at the time of shipment, may be recorded on recording medium distributed separately, or may be downloaded over the Internet.

For convenience, in some instances, the operation flow in the patent claims, the specification and/or the drawings, has described using words inferring a sequence, such as "first" and "next", and/or illustrated in a manner inferring sequence. However, unless particularly described as being necessary, an order or sequence implied in describing and/or illustrating a particular implementation might not be necessary.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

The present invention has an object to provide a focus adjusting apparatus which can optimize balance between AF performance and appearance of moving image, regardless of which area is enlarged and recorded as a moving image.

What is claimed is:

1. A focus adjusting apparatus comprising:
an image capturing unit which (1) generates an image signal by forming an optical image by an optical system having a focus lens and capturing the formed image in an image capturing range on an image sensor and (2) performs focusing based on a focusing detection signal regarding a focusing detection range specified within the image capturing range to record a portion of the image capturing range in enlargement;
a storage unit which stores information regarding image magnification change of the optical system due to movement of the focus lens; and
a wobbling drive control unit which controls a wobbling drive of the focus lens based on information regarding a position of the portion of the image capturing range in enlargement and the image magnification change.

2. The focus adjusting apparatus according to claim 1 wherein the wobbling drive control unit prohibits the wobbling drive in accordance with the position of the portion of the image capturing range in enlargement in the image capturing range when the image magnification change is equal to or over a predetermined value.

3. The focus adjusting apparatus according to claim 1 wherein the wobbling drive control unit sets an amplitude of the wobbling drive smaller in accordance with the position of the portion of the image capturing range in enlargement in the image capturing range when the image magnification change is equal to or over a predetermined value, relative to the amplitude of the wobbling drive when the image magnification change is smaller than the predetermined value.

4. The focus adjusting apparatus according to claim 1 wherein the wobbling drive control unit sets a displacement amount of the lens position at the center of amplitude of the wobbling drive smaller in accordance with the position of the portion of the image capturing range in enlargement in the image capturing range when the image magnification change is equal to or over a predetermined, relative to the displacement amount of the lens position at the center of amplitude of the wobbling drive when the image magnification change is smaller than the predetermined value.

5. The focus adjusting apparatus according to claim 1 wherein the wobbling drive control unit sets a threshold for determining the displacement direction of the lens position of the wobbling drive smaller in order to determine the displacement direction of the lens position, in accordance with the position of the portion of the image capturing range in enlargement in the image capturing range when the image magnification change is equal to or over a predetermined value, relative to the threshold for determining the displacement direction of the lens position of the wobbling drive when the image magnification change is smaller than the predetermined value.

6. The focus adjusting apparatus according to claim 1 further comprising:
a scan drive control unit which controls scan drive of the focus lens and sets the threshold for determining the displacement direction of the lens position of the scan direction smaller in order to determine the displacement direction of the lens position using the threshold, in accordance with the position of the portion of the image capturing range in enlargement in the image capturing range when the image magnification change is equal to or over a predetermined value, relative to the threshold for determining the displacement direction of the lens position of the scan direction when the image magnification change is smaller than the predetermined value.

7. The focus adjusting apparatus according to claim 1 wherein the wobbling drive control unit executes the wobbling drive at a predetermined frequency, and executes the wobbling control at a lower frequency in accordance with the position of the portion of the image capturing range in enlargement in the image capturing range when the image magnification change is equal to or over a predetermined value, relative to the frequency when the image magnification change is smaller than the predetermined value.

8. The focus adjusting apparatus according to claim 1 wherein the storage unit stores information regarding the image magnification change in one of (A) a table, or (B) a converting equation, which defines a relationship between the display position in the image capturing range and the image magnification change.

9. The focus adjusting apparatus according to claim 1 further comprising:
a display unit for displaying a portion of the image capturing range in enlargement,
wherein the wobbling drive control unit adjusts the position of the area to be recorded in enlargement in the image capturing range to a position where a cropped image from a portion of the image capturing range is generated due to movement of an image in response to the displacement of the lens position of the wobbling drive, in accordance with the position of the portion of the image capturing range in enlargement in the image capturing range, when the image magnification change is equal to or over a predetermined value.

10. A focus adjusting apparatus comprising:
an image capturing unit for (1) generating an image signal by forming an optical image by an optical system having a zoom lens and a focus lens, and capturing the formed image in an image capturing range on an image sensor and (2) performing focusing based on a focusing detection signal regarding a focusing detection range specified within the image capturing range;
a storage unit which stores information regarding image magnification change of the optical system due to movement of the focus lens;
a zoom position detecting unit which detects a position of the zoom lens in an optical axis direction; and
a wobbling drive control unit which controls a wobbling drive of the focus lens based on information regarding the position of the zoom lens, a position of the portion of the image capturing range in enlargement, and the image magnification change.

11. The focus adjusting apparatus according to claim 1 wherein the position of the portion of the image capturing range in enlargement falls within one of (A) a normal area within a predetermined percentage of the image capturing center, (B) a restricted area outside the normal area but within a second predetermined percentage of the image capturing center, and (C) a prohibited area outside the normal and restricted areas.

12. The focus adjusting apparatus according to claim 10 wherein the position of the portion of the image capturing range in enlargement falls within one of (A) a normal area within a predetermined percentage of the image capturing center, (B) a restricted area outside the normal area but within a second predetermined percentage of the image capturing center, and (C) a prohibited area outside the normal and restricted areas.

13. The focus adjusting apparatus according to claim 1 wherein the position of the portion of the image capturing range in enlargement falls within one of (A) a first area corresponding to a central portion within a predetermined percentage of the image capturing center, and (B) a second area corresponding to a peripheral portion outside the predetermined percentage of the image capturing center.

14. The focus adjusting apparatus according to claim 10 wherein the position of the portion of the image capturing range in enlargement falls within one of (A) a first area corresponding to a central portion within a predetermined percentage of the image capturing center, and (B) a second area corresponding to a peripheral portion outside the predetermined percentage of the image capturing center.

* * * * *